United States Patent
Jitsukawa et al.

(10) Patent No.: US 8,630,359 B2
(45) Date of Patent: Jan. 14, 2014

(54) RADIO TRANSMISSION METHOD, RADIO RECEPTION METHOD, RADIO TRANSMISSION APPARATUS AND RADIO RECEPTION APPARATUS

(75) Inventors: Daisuke Jitsukawa, Kawasaki (JP); Hiroyuki Seki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1066 days.

(21) Appl. No.: 11/601,758

(22) Filed: Nov. 20, 2006

(65) Prior Publication Data

US 2007/0263738 A1 Nov. 15, 2007

(30) Foreign Application Priority Data

May 9, 2006 (JP) .................................. 2006-130396

(51) Int. Cl.
*H04K 1/10* (2006.01)

(52) U.S. Cl.
USPC ........... 375/260; 375/132; 375/238; 375/295; 370/212; 370/215; 455/7

(58) Field of Classification Search
USPC ......... 375/260, 132, 238, 295, 300, 303, 316, 375/350, 353; 370/212, 215; 455/7; 327/26, 327/31
See application file for complete search history.

(56) References Cited

U.S. PATENT DOCUMENTS

| | | | | |
|---|---|---|---|---|
| 5,790,514 A | * | 8/1998 | Marchok et al. | 370/208 |
| 5,943,329 A | * | 8/1999 | Ohgoshi et al. | 370/335 |
| 6,067,333 A | * | 5/2000 | Kim et al. | 375/346 |
| 6,487,252 B1 | * | 11/2002 | Kleider et al. | 375/260 |
| 7,301,989 B2 | * | 11/2007 | Tamaki et al. | 375/146 |
| 2002/0034213 A1 | * | 3/2002 | Wang et al. | 375/132 |
| 2002/0131529 A1 | * | 9/2002 | Iwamatsu et al. | 375/324 |
| 2006/0018393 A1 | * | 1/2006 | Gore et al. | 375/260 |
| 2006/0189279 A1 | * | 8/2006 | Kobayashi et al. | 455/101 |
| 2007/0230591 A1 | * | 10/2007 | Choi et al. | 375/260 |
| 2007/0263738 A1 | * | 11/2007 | Jitsukawa et al. | 375/260 |
| 2008/0182532 A1 | * | 7/2008 | Kobayashi et al. | 455/127.2 |
| 2008/0186880 A1 | * | 8/2008 | Seki et al. | 370/281 |

(Continued)

FOREIGN PATENT DOCUMENTS

| | | |
|---|---|---|
| EP | 0952696 A2 | 10/1999 |
| WO | WO-2006/019709 A1 | 2/2006 |
| WO | WO 2007/091590 A1 | 8/2007 |

OTHER PUBLICATIONS

R. Dinis, et al. "A Multiple Access Scheme for the Uplink of Broadband Wireless Systems", IEEE Globecom Dec. 2004.

(Continued)

*Primary Examiner* — Chieh M Fan
*Assistant Examiner* — Santiago Garcia
(74) *Attorney, Agent, or Firm* — Fujitsu Patent Center

(57) ABSTRACT

A pilot signal is transmitted with a predetermined frequency band and a data signal is transmitted with a partial band of the frequency band, and the pilot signal and the data signal to be transmitted with at least the partial band, are controlled its waveform to have the same waveforms in a frequency domain. Thus, in the case of controlling waveforms of the pilot signal and the data signal which have different occupied bands, it is possible to, in a portion of the occupied band for the data signal, avoid the mapping of a low-quality pilot signal or the like, enhance the data signal demodulation capability and improve the data signal reception characteristic while suppressing PAPR.

15 Claims, 19 Drawing Sheets

(56) References Cited

U.S. PATENT DOCUMENTS

| | | | |
|---|---|---|---|
| 2009/0052427 A1 | 2/2009 | Oketani et al. | |
| 2009/0067558 A1* | 3/2009 | Mourad | 375/348 |
| 2009/0103666 A1* | 4/2009 | Zhao et al. | 375/341 |
| 2009/0154575 A1* | 6/2009 | Rofougaran | 375/260 |
| 2009/0185630 A1* | 7/2009 | Yang | 375/260 |
| 2009/0190675 A1* | 7/2009 | Ling et al. | 375/260 |
| 2009/0196165 A1* | 8/2009 | Morimoto et al. | 370/208 |
| 2009/0203377 A1* | 8/2009 | Kawasaki | 455/435.1 |

OTHER PUBLICATIONS

Motorola, "Uplink Multiple Access for EUTRA" (R1-050245), 3GPP TSG RAN1 # 40 bis Meeting, Beijing, China Apr. 4-8, 2005.

NTT DoCoMo "Optimum Roll-off Factor for DFT-Spread OFDM Based SC-FDMA in Uplink" (R1-060318), 3 GPP TSG-RAN WG1 Meeting #44, Denver, USA.

Huawei "Improved SC-FDMA PAPR reduction by non root-raised cosine spectrum-shaping functions" (R1-051092), 3GPP TSG-RAN WG1 Meeting # 42bis, San Diego, USA Oct. 10-14, 2005.

NEC Group, "Considerations on uplink pilot design using CAZAC", TSG-RAN WG1 Meeting #44, Feb. 13-17, 2006, Denver, USA.

Japanese Office Action mailed May 10, 2011 for corresponding Japanese Application No. 2006-130369, with English-language Translation.

NTT DoCoMo, NEC, Sharp, "DFT-Spread OFDM with Pulse Shaping Filter in Frequency Domain in Evolved UTRA Uplink," Aug. 29-Sep. 2, 2005, 3GPP TSG RAN WG1 #42 on LTE, London, UK, pp. 1-8, R1-050702.

Samsung, "Spectrum shaping filtering in DFT-spread OFDM," 3GPP TSG RAN WG1 Meeting #42bis, San Diego, USA, Oct. 10-14, 2005, 5 pages, R1-051038.

Extended European Search Report dated Jul. 22, 2013 for corresponding European Application No. 06255839.0.

\* cited by examiner

RADIO TRANSMISSION METHOD, RADIO RECEPTION METHOD, RADIO TRANSMISSION APPARATUS AND RADIO RECEPTION APPARATUS

CROSS REFERENCE TO RELATED APPLICATIONS

This application is based on and hereby claims priority to Japanese Application No. 2006-130396 filed on May 9, 2006 in Japan, the contents of which are hereby incorporated by reference.

BACKGROUND OF THE INVENTION (1) Field of the Invention

The present invention relates to a radio transmission method, radio reception method, radio transmission apparatus and radio reception apparatus and, for example, it relates to a technique suitable for use in a next-generation mobile communication system employing a DFT (Discrete Fourier Transform)-Spread OFDM (Orthogonal Frequency Division Multiplexing) method which is one of radio access modes.

(2) Description of the Related Art

In a next-generation mobile communication system, as the principal characteristics (necessary conditions) needed for radio access modes with respect to an uplink from a mobile terminal (MS : Mobile Station) to a base station (BTS : Base Transceiver Station), there are requirements for a high frequency utilization efficiency and a low PAPR (Peak-to-Average Power Ratio) of a transmission signal. For these requirements to reach satisfaction, the employment of FDMA (Frequency Division Multiple Access) in terms of a single carrier (SC) has come into discussion (for example, see the non-patent document 1 mentioned later). As one of radio access modes which can meet the above-mentioned requirements, special attention has been paid to a DFT-Spread OFDM mode (for example see the non-patent documents 2 and 3 mentioned later).

One feature thereof is that the employment of signal processing in a frequency domain after DFT processing enables a signal component of a single carrier (SC) to be arranged flexibly in the frequency domain.

FIGS. 10(A) and 10(B) each shows an example of arrangement of a signal in a frequency domain. In FIGS. 10(A) and 10(B), RB is an abbreviation of a resource block and signifies, of a system frequency band (system bandwidth), a minimum unit of frequency band each transmission station (for example, MS) uses.

In addition, FIG. 10(A) is an illustration of one example of a case in which RBs are arranged in a state localized (arranged locally) in a system frequency band, where continuous frequencies (subcarriers) are bundled into one RB. On the other hand, FIG. 10(B) is an illustration of one example of a case in which RBs are arranged in a state distributed (arranged distributively) in a system frequency band, where subcarriers with the same RB number #i (i=1, 2, 3, 4, . . . ), arranged discontinuously (at intervals), are bundled, thereby occupying a frequency band corresponding to one RB in FIG. 10(A).

Accordingly, with respect to each of the localized arrangement shown in FIG. 10(A) and the distributed arrangement shown in FIG. 10(B), the occurrence of multi-user interference in the same cell is avoidable in such a manner that each transmission station uses a different RB, which provides a high frequency utilization efficiency. Moreover, in a case in which the frequency scheduling is used simultaneously in the case of the localized arrangement shown in FIG. 10(A), if an RB with a high reception quality is allocated to each transmission station, the throughput of the entire cell is improvable.

Another feature is that, because of a single carrier transmission system, the PAPR is lower than that of a multicarrier transmission system such as OFDM. In addition, the PAPR can be made lower by simultaneous use of a waveform shaping filter (roll-off filter) with a small amount of operations according to windowing processing in a frequency domain.

A detailed description will be given hereinbelow of a DFT-Spread OFDM mode.

FIG. 11 is a functional block diagram taking note of a transmission processing system of a transmission station 100.

This transmission station 100 shown in FIG. 11 is made up of, as a transmission processing system, for example, a turbo encoder 101, a data modulator 102, a DFT (Discrete Fourier Transformer) 103, a subcarrier mapper 104, an IFFT (Inverse Fast Fourier Transformer) 105, a CP (Cyclic Prefix) inserting section 106, a pilot signal generator 107, a DFT 108, a subcarrier mapper 109, an IFFT 110, a CP inserting section 111, a data/pilot signal multiplexer 112, a digital/analog (D/A) converter 113, an RF (Radio Frequency) transmitter 114, and a transmission antenna 115. Moreover, reference numeral 121 designates a reception antenna and numeral 122 depicts a control signal demodulator for demodulating a control signal received through the reception antenna 121 from the reception station 200, each of which is a component of a reception processing system of the transmission station 100.

In the transmission station 100 thus configured, the control signal demodulator 121 demodulates a control signal feed-backed from a reception station 200 and received through the reception antenna 121 so as to extract RB allocation information. The RB allocation information extracted therefrom is supplied to the DFT 103 and further to the subcarrier mapper 104. For example, the RB allocation information includes the numbers of RBs allocated and RB numbers.

On the other hand, a data signal to be transmitted to the reception station 200 is first turbo-encoded (error-correction-encoded) in the turbo encoder 101 and then data-modulated in the data modulator 102 and inputted to the DFT 103.

The DFT 103 carries out DFT processing in units of symbols corresponding to the RB allocation information (the number of RBs allocated) from the control signal demodulator 122 to convert a data signal in a time domain into a signal in a frequency domain. For example, when the number of subcarriers of an RB is taken as NC and the number of RBs allocated is taken as $N_{RB}$, the DFT processing is conducted in units of $N_C \times N_{RB}$ symbols.

Furthermore, the subcarrier mapper 104 maps an output signal from the DFT 103 into a subcarrier in a frequency domain under, for example, a localized arrangement [see FIG. 10 (A)] on the basis of the RB allocation information from the control signal demodulator 122, and the IFFT 105 conducts the IFFT processing on the signal in the frequency domain, mapped into the subcarrier in this way, thereby again making a conversion into a signal in a time domain.

For the purpose of principally improving the resistance against the multipath interference, the CP inserting section 106 inserts a cyclic prefix (CP) [equally referred to as a "guard interval (GI)"] into an output signal from the aforesaid IFFT 105 in units of sample (FFT block).

On the other hand, with respect to a pilot signal, the pilot signal generator 107 produces a pilot signal, and the DFT 108 carries out the DFT processing in units of symbols corresponding to one RB.

Moreover, for the purpose of measuring a radio channel quality information (CQI : Channel Quality Indicator) on each RB in the reception station 200, the subcarrier mapper 109 maps an output signal from the DFT 108 into a subcarrier under the distributed arrangement [see FIG. 10(B)] throughout the system frequency band.

The IFFT 110 carries out the IFFT processing on the signal in the frequency domain, thus mapped in terms of the distributed arrangement, so as to again make a conversion into a signal in a time domain, and the CP inserting section 111 inserts a CP into an output signal from this IFFT 110 in units of sample.

Furthermore, the data/pilot signal multiplexer 112 time-multiplexes the data signal from the CP inserting section 106 and the pilot signal from the CP inserting section 111. A time-multiplexed signal (transmission signal) is D/A-converted in the D/A converter 113 and then quadrature-modulated in the RF transmitter 114 to be converted (up-converted) from a baseband signal into a radio frequency signal, and finally transmitted through the transmission antenna 115 to the reception station 200.

FIG. 12 shows an example of arrangement of a data signal and a pilot signal in the above-mentioned transmission signal in the form of a matrix in time and frequency directions.

As mentioned above, in FIG. 12, a domain for a data signal and domains for pilot signals are time-multiplexed, and the domains for the pilot signals are disposed at both end portions of one subframe and the domain for the data signal is disposed therebetween. Moreover, RBs each forms a minimum unit of a frequency band each transmission station uses are arranged locally with respect to the data signal and arranged distributively with respect to the pilot signals. In the example shown in FIG. 12, as indicated by hatching, RB2 is fixedly allocated to the pilot signal of a transmission station A while RB1 and RB2 are allocated to the data signal on the basis of the RB allocation information.

FIG. 13 is a functional block diagram taking note of a reception processing system in the reception station 200.

The reception station 200 shown in FIG. 13 is made up of, as a reception processing system, for example, a reception antenna 201, an RF receiver 202, an analog/digital (A/D) converter 203, a CP deleting section 204, a path searcher 205, a data/pilot signal demultiplexer 206, FFT (Fast Fourier Transformer) 207, 208, a channel estimator 209, a time/frequency interpolator 210, a weighting factor generator 211, a frequency domain equalizer 212, a subcarrier demapper 213, an IDFT (Inverse Discrete Fourier Transformer) 214, a data demodulator 215, a turbo decoder 216, a pilot signal generator 217, a DFT 218, a subcarrier mapper 219, an SIR estimator 220, an RB allocating section 221, a buffer 222, and an effective subcarrier judger 223. Moreover, reference numeral 231 denotes a control signal modulator made to modulate a control signal including the next RB allocation information from the RB allocator 221 and numeral 232 represents a transmission antenna, each of which is a component of a transmission processing system of the reception station 200.

In the reception station 200 thus configured, the RF receiver 202 first converts (down-converts) a radio frequency signal, transmitted from the transmission station 100 and received through the reception antenna 201, into a baseband signal and, after quadrature-demodulated, the A/D converter 203 carries out the A/D conversion thereon.

The digital signal after the A/D conversion is inputted to the CP deleting section 204 and the path searcher 205. The path searcher 205 carries out a correlative operation between a received signal and a replica of a transmission pilot signal (herein after referred to as a "pilot replica") in a time domain, thereby detecting a reception timing (start point of an effective signal component) of each path.

The CP deleting section 204 deletes the CP from the received signal on the basis of the information on the reception timing detected by the path searcher 205 so as to extract an effective signal component. The extracted effective signal component is inputted to the data/pilot signal demultiplexer 206, thereby demultiplexing a data signal and a pilot signal, time-multiplexed.

In addition, the received pilot signal is inputted to the FFT 208 where it undergoes the FFT processing for the conversion from the signal in the time domain into the signal in the frequency domain and is then inputted to the channel estimator 209. Still additionally, the pilot signal generator 217 generates a transmission pilot replica in the time domain, and this pilot replica undergoes the DFT processing in the DFT 218 for the conversion from the signal in the time domain to a signal in the frequency domain and is then mapped by the subcarrier mapper 219 in terms of the same subcarrier arrangement (distributed arrangement) as that of the transmission station 100.

The channel estimator 209 carries out, with respect to a subcarrier where a pilot signal is arranged in a distributive manner, a correlative operation between a received pilot signal from the FFT 209 and a transmission pilot replica from the subcarrier mapper 219 in a frequency domain so as to estimate a channel distortion of a frequency domain in a radio channel (that is, to obtain a channel estimate).

The SIR estimator 220, as a first purpose, estimates a received SIR to each RB for a data signal on the basis of the channel estimate obtained by the channel estimator 209. As an example of the estimating method, through the use of a channel estimate of a subcarrier where the target pilot signal of the transmission station 100 is disposed for each RB for the data signal, the sum of the square of a real number of the channel estimate expressed by a complex number and the square of an imaginary number thereof is considered to be a desired signal component S and a variance of a plurality of symbols is regarded as an interference signal power I, and the ratio of S and I is set as a received SIR estimate.

As a second purpose, the SIR estimator 220 calculates a noise power estimate to be used in the weighting factor generator 211 which will be mentioned later. Concretely, it is calculated by averaging the respective data signal RB interference powers I, obtained in the process of obtaining the estimate of the received SIR, among the RBs.

The RB allocator 221 allocates an RB, used for the next data signal transmission from the transmission station 100, on the basis of the received SIR estimate of each RB for the data signal. As an example of the allocation method, there is a method of allocating an RB whose received SIR estimate exceeds a specified threshold.

The time/frequency interpolator 210 carries out the interpolation processing (linear interpolation or the like) in a time direction and in a frequency direction on the basis of the channel estimates of portions of subcarriers and FFT blocks in a subframe, obtained by the channel estimator 209, thereby calculating the channel estimates of all the subcarriers and all the FFT blocks in the subframe.

The weighting factor generator 211 generates an MMSE (Minimum Mean Square Error) weight to be used in the frequency domain equalizer 212 which will be mentioned later. For example, with respect to specified subcarriers and FFT blocks, when a channel estimate is taken as H and a noise power estimate is taken as $N^2$, the MMSE weight W is given by the following equation (1) where H* represents a complex conjugate of H.

$$W = \frac{H^*}{|H|^2 + N^2} \quad (1)$$

On the other hand, a received data signal is FFT-processed by the FFT 207 to be converted from a signal in a time domain into a signal in a frequency domain and then frequency-domain equalized by the frequency domain equalizer 212. Concretely, with respect to specified subcarriers and FFT blocks, an operation is made to multiply a received data signal by the aforesaid MMSE weight W corresponding thereto.

The effective subcarrier judger 223 makes a judgment on a position of a subcarrier (effective subcarrier), where an effective data signal is disposed, on the basis of the RB allocation information from the RB allocating section 221, held in the buffer 222.

The subcarrier demapper 213 extracts a signal of an RB, where the target data signal of the transmission station 100 is disposed, from a received signal of each FFT block after the frequency domain equalization by the frequency domain equalizer 212 on the basis of the information on the effective subcarrier judged by the effective subcarrier judger 223.

The IDFT 214 carries out the IDFT processing on the data signal in the frequency domain from the aforesaid subcarrier demapper 213 to make a conversion into a signal in a time domain. The signal in the time domain is data-demodulated by the data demodulator 215 and then turbo-decoded (error-correction-decoded) by the turbo decoder 216, thus providing a data signal restored.

The control signal modulator 231 maps the RB allocation information requested by RB allocator 221 to be used for the transmission of the next data signal from the transmission station 100, obtained by the RB allocator 221, into a control signal and feedbacks it through the transmission antenna 232 to the transmission station 100.

[Non-Patent Document 1] Rui Dinis, et al. "A Multiple Access Scheme for the Uplink of Broadband Wireless Systems", IEEE Globecom 2004, December, 2004

[Non-Patent Document 2] NTT DoCoMo, "Optimum Roll-off Factor for DFT-Spread OFDM Based SC-FDMA in Uplink" (R1-060318), 3GPP TSG-RAN WG1 Meeting #44, Denver, USA, 13-17 Feb. 2006

[Non-Patent Document 3] Motorola, "Uplink Multiple Access for EUTRA" (R1-050245), 3GPP TSG RAN1 #40bis Meeting, Beijing, China, Apr. 4-8, 2005

[Non-Patent Document 4] Huawei, "Improved SC-FDMA PAPR reduction by non root-raised cosine spectrum-shaping functions" (R1-051092), 3GPP TSG-RAN WG1 Meeting #42bis, San Diego, USA, 10-14 Oct. 2005

The above description relates to a basic apparatus configuration according to a DFT-Spread OFDM. A description will be given hereinbelow of a case in which waveform shaping filtering is made with the windowing processing in a frequency domain in the transmission station 100 for the purpose of further reducing the PAPR of a transmission signal.

FIG. 14 illustratively shows a processing procedure in a waveform shaping filter (roll-off filter).

First of all, as shown by (1) and (2) in FIG. 14, a signal s(n) is produced by cyclically copying, of an $N_{TX}$ sample signal (signal before the application of a filter) in a frequency domain, each of $N_{TX_{EXT}}$ samples (see oblique line portions) at both ends. In this case, $N_{TX_{EXT}}$ is given using a roll-off rate α, which will be mentioned later, according to the following equation (2).

$$N_{TX\_EXT} = \left[\frac{\alpha \cdot N_{TX}}{2}\right] \quad (2)$$

Following this, the foregoing signal s (n) is multiplied by a window function in the frequency domain. In a case in which a root raised cosine function shown by (3) in FIG. 14 is used as the window function, a signal k(n) after the application (employment) of a filter (Root cosine roll-off filter) is given by the following equations (3), (4) and (5) [see (4) in FIG. 14].

$$N_{TX2} = N_{TX} + N_{TX\_EXT} \cdot 2 \quad (3)$$

$$f_n = \frac{1+\alpha}{N_{TX2}} \cdot \left(n + \frac{1}{2}\right) - \frac{1+\alpha}{2} \quad (4)$$

$$k(n) = s(n)\sqrt{\frac{1}{2}\left\{1 - \sin\left[\frac{\pi}{2\alpha}(2 \times |f_n| - 1)\right]\right\}} \quad (5)$$

$(n = 0, \cdots, 2 \cdot N_{TX\_EXT} - 1, N_{TX2} - 2 \cdot N_{TX\_EXT} - 1, \cdots, N_{TX2} - 1)$ $k(n) = s(n)$ $(n = 2 \cdot N_{TX\_EXT}, \cdots, N_{TX2} - 2 \cdot N_{TX\_EXT})$ Therefore, it is known that, with respect to the signal k(n) after the filter application, although the occupied bandwidth becomes larger as the roll-off rate increases, the PAPR becomes smaller.

In this connection, for reducing the PAPR of a transmission signal, a window function other than the Root raised cosine function is also usable. For example, the above-mentioned non-patent document 4 discloses that the PAPR decreases by the employment of a window function which is optimized for each modulation mode and which is not specified by a roll-off rate.

FIG. 15 is a functional block diagram taking note of a transmission processing system of a transmission station 100 to which a waveform shaping filter (roll-off filter) is applied.

The transmission station 100 shown in FIG. 15 differs from the transmission station 100 described above with reference to FIG. 11 in that PSF switching sections 116, 118 and a plurality of waveform shaping filters (pulse shaping filter) 117-1 to 117-$N_{RBall}$ [PSF(1) to PSF($N_{RBall}$)] corresponding to the total number $N_{RBall}$ of RBs are provided between a DFT 103 and a subcarrier mapper 104 for a data signal, a waveform shaping filter (PSFp) 119 is provided between a DFT 108 and a subcarrier mapper 109 for a pilot signal, and with respect to each of the data signal and the pilot signal, waveform shaping is conducted between DFT processing and subcarrier mapping processing (unless otherwise specified particularly, the other components marked with the same reference numerals as those used above are the same as or correspond to the components mentioned above.

That is, with respect to a data signal, since the number of output symbols from the DFT 103 varies according to the number $N_{RB}$ of allocated RBs as mentioned above, when the total number of RBs is taken as $N_{RBall}$, the waveform shaping filters 117-1 to 117-$N_{RBall}$ corresponding to the numbers (1 to $N_{RBall}$) of allocated RBs are prepared so as to switch the PSF switches 116 and 118 synchronously on the basis of the aforesaid RB allocation information, thereby applying appropriate waveform shaping filters 117-$i$ ($i$=1 to $N_{RBall}$).

For example, when the appropriate waveform shaping filters 117-$i$ are applied with respect to a data signal DFT-processed in units of $N_C \times N_{RB}$ symbols in the DFT 103 as shown by (1) in FIG. 16, a data signal with an occupied bandwidth of $N_C \times N_{RB} \times (1+\alpha)$ made wider (spread) than the occupied bandwidth ($N_C \times N_{RB}$) of the effective subcarrier according to the roll-off rate $\alpha$ is obtainable as a filter output as shown by (2) in FIG. 16. Incidentally, the method for the application of the waveform shaping filters 117-$i$ is uniquely determined according to the RB allocation information and is well-known in the reception station 200.

A data signal after the application of the waveform shaping filters 117-$i$ is subcarrier-mapped under a localized arrangement, for example, shown by (3) in FIG. 16 in the subcarrier mapper 104. However, in this example, of $N_{RBall}$ RBs in total, RBs, which are $N_{RB}$ in number, are allocated as effective subcarriers.

On the other hand, with respect to a pilot signal, the number of output symbols from the DFT section 108 is fixed and, hence, the waveform shaping filter 119 is directly applied with respect to an output signal from the DFT 108. For example, when the waveform shaping filter 119 is applied with respect to a signal DFT-processed in units of $N_C$ symbols in the DFT section 108 as shown by (1) in FIG. 17, a pilot signal with an occupied bandwidth of $N_C \times (1+\alpha)$ spread by a quantity corresponding to the roll-off rate $\alpha$ is obtainable as an filter output as shown by (2) in FIG. 17.

In addition, in the subcarrier mapper 109, a pilot signal after the application of the waveform shaping filter 119 is subcarrier-mapped with respect to a system bandwidth [$N_C \times N_{RBall} \times (1+\alpha)$] under a distributed arrangement, for example, as shown by (3) in FIG. 17.

Furthermore, FIG. 18 is a functional block diagram tasking note of a reception processing system of the reception station 200 to which a waveform shaping filter is applied.

The reception station 200 shown in FIG. 18 differs from the configuration described above with reference to FIG. 13 in that a waveform shaping filter (PSFp) 224 having the same window function (roll-off rate $\alpha$) as that of the waveform shaping filter 119 on the transmission station 100 side is provided between the DFT 218 for the production of a pilot replica and the subcarrier mapper 219 so as to carry out the same waveform shaping as the waveform shaping by the transmission station 100 side waveform shaping filter 119 at the production of a transmission pilot replica in a frequency domain. Moreover, in this case, the effective subcarrier judger 223 makes a judgment on a position of an effective subcarrier, where a data signal is arranged, by use of RB allocation information while consideration is given to the fact that the application of the waveform shaping filter 117-$i$ in the transmission station 100 widens the occupied bandwidth of a data signal. The components marked with the same reference numerals as those used above are the same as or correspond to the components mentioned above.

FIG. 19 is an illustration of a comparison between a subcarrier arrangement of a data signal shown in FIG. 16 and a subcarrier arrangement of a pilot signal shown in FIG. 17.

In a case in which, as shown in FIG. 19, the waveform shaping filters 117-$i$ and 119 are applied with the same roll-off rate $\alpha$ but in different bandwidths with respect to the data signal and the pilot signal, for example, there is a possibility that a low-quality pilot signal is mapped in the vicinities of both the end portions of an occupied band of the data signal and that, since the channel distortion differs between both the signals, the reception characteristic degrades in the reception station 200.

That is, for example, at the right-side end (higher frequency side) of an occupied band of a data signal, a pilot signal with a low quality (S/N), whose amplitude attenuates due to the waveform shaping filter 119, is mapped with respect to a portion of the effective subcarriers, which can degrade the channel estimation accuracy and deteriorate the reception characteristic. On the other hand, at the left-side end (lower frequency side) of the occupied band of the data signal, with respect to a portion of the subcarriers, a channel distortion due to devices including the waveform shaping filters 117-$i$ and 119 differs between the data signal and the pilot signal, which can cause incorrect channel compensation for the data signal and deteriorate the reception characteristic of the data signal.

SUMMARY OF THE INVENTION

The present invention has been developed in consideration of the above-mentioned problems, and it is therefore an object of the invention to, when a waveform shaping filter is applied with respect to a pilot signal and a data signal which have different occupied bands, avoid mapping a pilot signal having a low quality or a pilot signal different in channel distortion from the data signal in a portion of the occupied band of the data signal, thereby enhancing the data signal demodulation capability (channel estimation accuracy and channel compensation accuracy) so as to improve the data signal reception characteristic while suppressing the PAPR.

For this purpose, the present invention is characterized by using the following radio transmission method, radio reception method, radio transmission apparatus and radio reception apparatus.

(1) In accordance with an aspect of the present invention, there is provided a radio transmission method of transmitting a data signal and a pilot signal to be used for demodulation processing on the data signal by wireless, comprising a pilot transmission step of transmitting the pilot signal through the use of a predetermined frequency band, a data transmission step of transmitting the data signal through the use of a partial band of the predetermined frequency band, and a waveform control step of waveform-shaping (controlling waveforms of) the pilot signal and the data signal, transmitted through the use of at least the partial band, so that the pilot signal and the data signal have the same shapes (waveforms) in a frequency domain.

(2) In this case, it is also appropriate that, in the data transmission step, the predetermined frequency band is divided by a predetermined band unit so that the data signal is transmitted in a state where each of the divided bands is set as the partial band and, in the waveform control step, the data signal and the pilot signal are waveform-shaped in units of the divided bands to have the same shapes (waveforms) in the frequency domain.

(3) In addition, it is also appropriate that, in the waveform control step, the pilot signal in a plurality of divided bands continuously existing among the divided bands and having no data signal is collectively waveform-shaped in a state where the plurality of divided bands are set as one band.

(4) Furthermore, in accordance with another aspect of the present invention, there is provided a radio reception method of transmitting a pilot signal to be used for demodulation processing on a data signal through the use of a predetermined frequency band and transmitting the data signal through the use of a partial band of the predetermined frequency band and receiving the pilot signal and the data signal by wireless from a radio transmission apparatus made to waveform-shape the pilot signal and the data signal, transmitted through the use of at least the partial band, so that the pilot signal and the data signal have the same shapes (waveforms) in a frequency domain, comprising a pilot replica generating step of generating a replica of the pilot signal, a waveform control step of waveform-shaping (controlling a waveform of) the replica generated in the pilot replica generating step in at least the partial band, and a demodulation step of carrying out demodulation processing on a received data signal in the partial band on the basis of the replica waveform-shaped in the waveform control step and the pilot signal received from the radio transmission apparatus.

(5) Still furthermore, in accordance with a further aspect of the present invention, there is provided a radio transmission apparatus, which is made to transmit a data signal and a pilot signal to be used for demodulation processing on the data signal by wireless, comprising pilot transmission means for transmitting the pilot signal through the use of a predetermined frequency band, data transmission means for transmitting the data signal through the use of a partial band of the predetermined frequency band, and waveform control means for waveform-shaping (controlling waveforms of) the pilot signal and the data signal, transmitted through the use of at least the partial band, so that the pilot signal and the data signal have the same shapes (waveforms) in a frequency domain.

(6) In this case, it is also appropriate that the data transmission means includes a data signal band dividing section for dividing the data signal in a state associated with divided bands obtained by dividing the predetermined frequency band by a predetermined band unit, a data signal filtering section for waveform-shaping the data signal in units of data signals obtained by the division by the data signal band dividing section, and a data signal mapper for mapping a data signal after the waveform shaping by the data signal filtering section into the divided band forming the partial band, and the pilot transmission means includes a pilot signal band dividing section for dividing the pilot signal by a unit of the divided band, a pilot signal filtering section for waveform-shaping the pilot signal in units of pilot signals obtained by the division by the pilot signal band dividing section so as to produce the same shape in a frequency domain, and a pilot signal mapper for mapping the pilot signal after the waveform shaping by the pilot signal filtering section into the divided bands, with the data signal band dividing section, the data signal filtering section, the pilot signal band dividing section and the pilot signal filtering unit constituting the waveform control means.

(7) Moreover, it is also appropriate that the pilot signal filtering section is made to waveform-shape collectively the pilot signals in a plurality of divided bands continuously existing among the divided bands and having no data signal in a state where the plurality of divided bands are set as one band.

(8) Still moreover, it is also acceptable that, in a frequency domain, a shape of the pilot signal in the plurality of divided bands continuously existing and having no data signal is different from a shape of the pilot signal in the divided bands having the data signal.

(9) Yet moreover, it is preferable that the waveform shaping is conducted in a frequency domain.

(10) In addition, in accordance with a further aspect of the present invention, there is provided a radio reception apparatus, which is made to transmit a pilot signal to be used for demodulation processing on a data signal through the use of a predetermined frequency band and transmit the data signal through the use of a partial band of the predetermined frequency band and receiving the pilot signal and the data signal by wireless from a radio transmission apparatus made to waveform-shape the pilot signal and the data signal, transmitted through the use of at least the partial band, so that the pilot signal and the data signal have the same shape in a frequency domain, comprising pilot replica generating means for generating a replica of the pilot signal, waveform control means for waveform-shaping the replica generated by the pilot replica generating means with respect to at least the partial band, and demodulation means for carrying out demodulation processing on a received data signal in the partial band on the basis of the replica waveform-shaped by the waveform control means and the pilot signal received from the radio transmission apparatus.

The above-described present invention can provide at least one of the following effects and advantages.

(1) In a case in which a data signal is transmitted through the use of a partial band of a frequency band for the transmission of a pilot signal, the pilot signal (replica on the reception side) to be transmitted through the use of at least the partial band and the data signal are waveform-shaped to have the same shape in a frequency domain, thereby mapping a pilot signal whose amplitude does not attenuate due to the waveform shaping or a pilot signal equal in channel distortion to a data signal with respect to all the effective frequencies of the data signal. This can enhance the demodulation processing capability (channel estimation accuracy and channel compensation capability) on the data signal on the reception side while suppressing the PAPR of a transmission signal, which improves the reception characteristic.

(2) In addition, since a pilot signal (pilot replica) with a frequency component where an effective data signal is absent is not used for the demodulation of a data signal, a plurality of divided bands can also be collectively waveform-shaped as one band, which permits flexible modifications, such as carrying out the waveform shaping into different configurations in a frequency domain in a band unit different from that of a data signal for convenience in other applications other than data signal demodulation.

(3) Still additionally, the waveform shaping on the data signal and the pilot signal in the aforesaid partial band is conducted in a frequency domain, which enables the waveform shaping to be easily realized with respect to arbitrary bands.

DESCRIPTION OF THE PREFERRED EMBODIMENTS

[A] Description of an Embodiment

Figure 1:
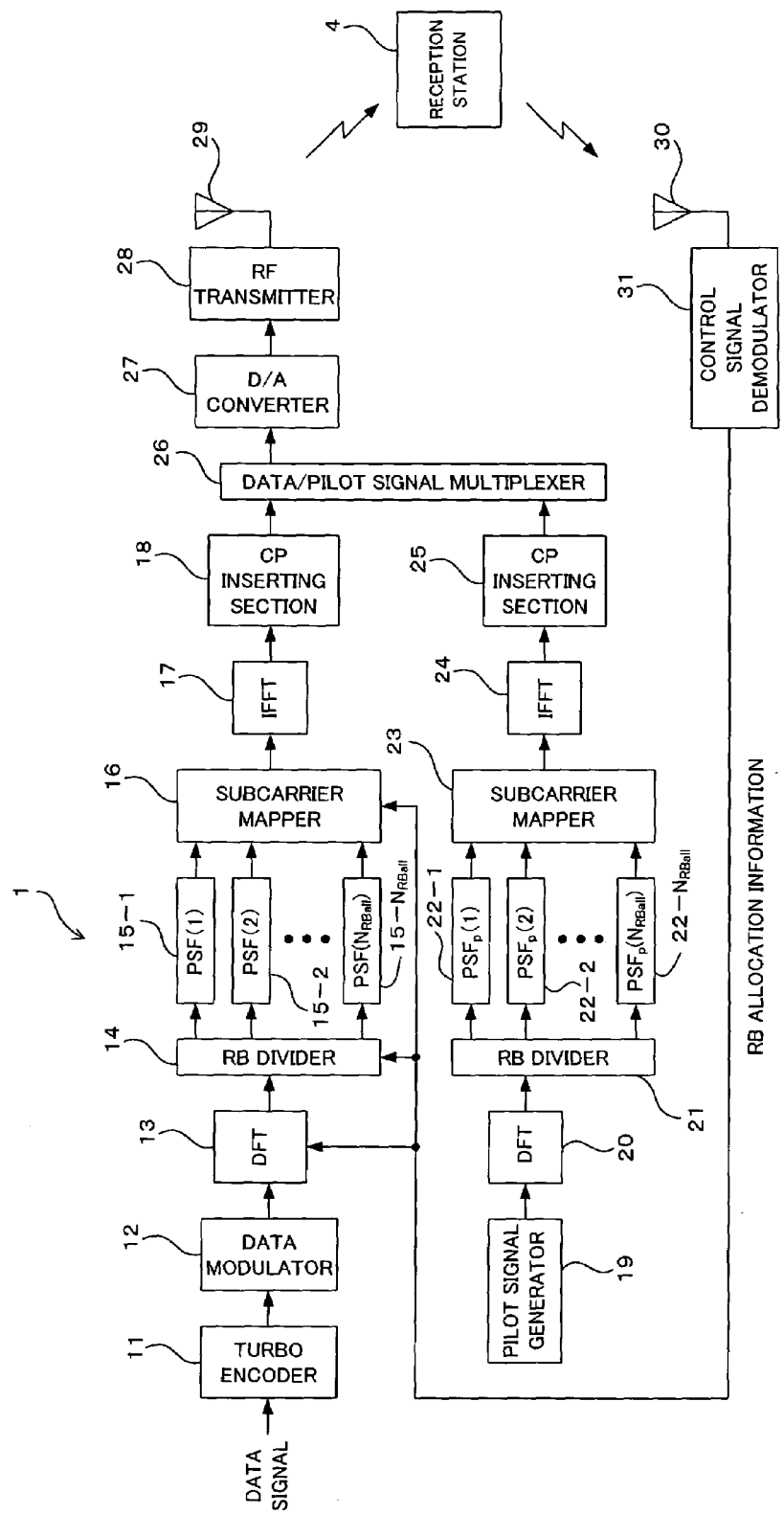
FIG. 1 is a functional block diagram taking note of a configuration of a transmission station in a system employing, as a radio communication system according to an embodiment of the present invention, a DFT-Spread OFDM which is one of single-carrier transmission modes.
Figure 4:
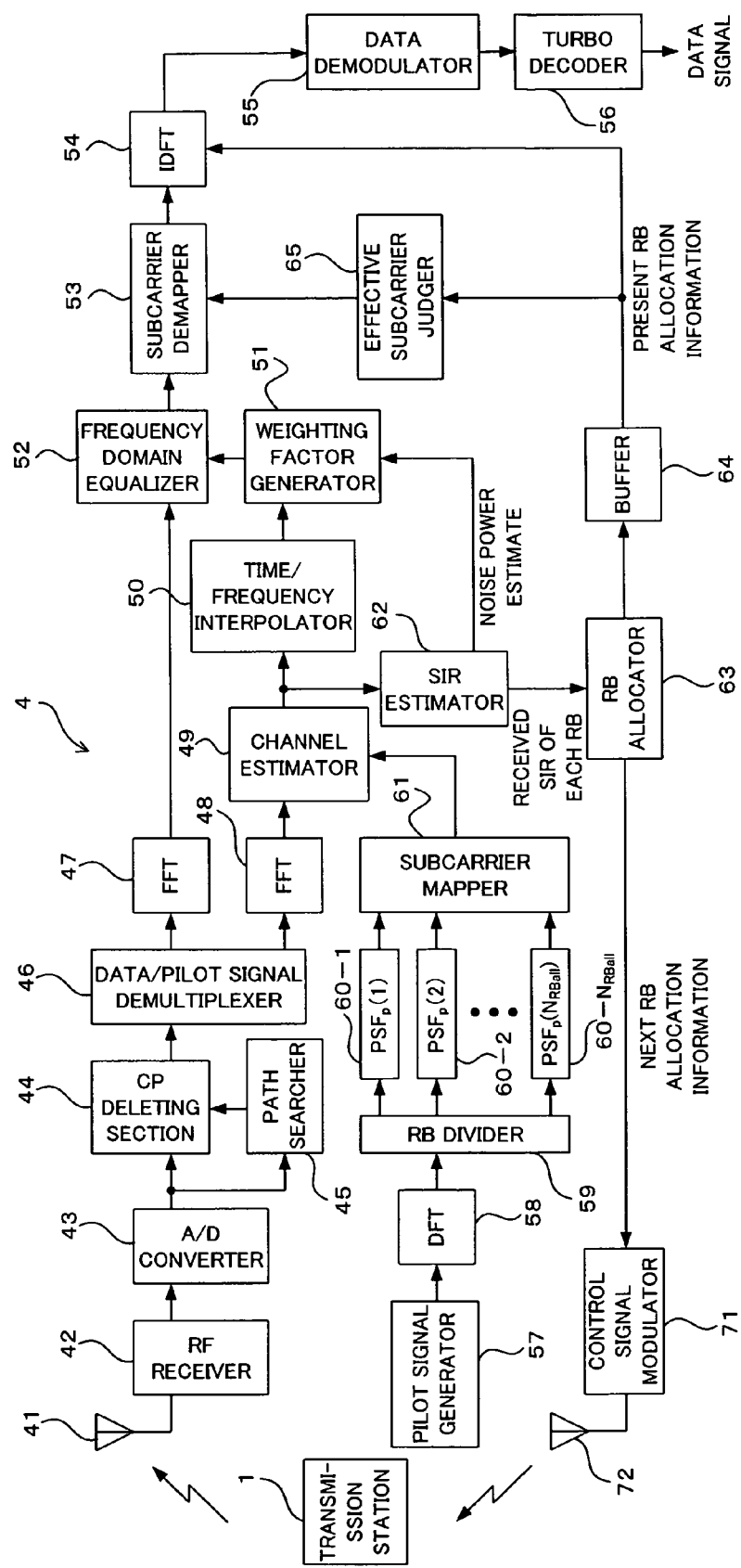
FIG. 4 is a functional block diagram taking note of a configuration of a reception station of the system shown in FIG. 1.
Figure 10B:
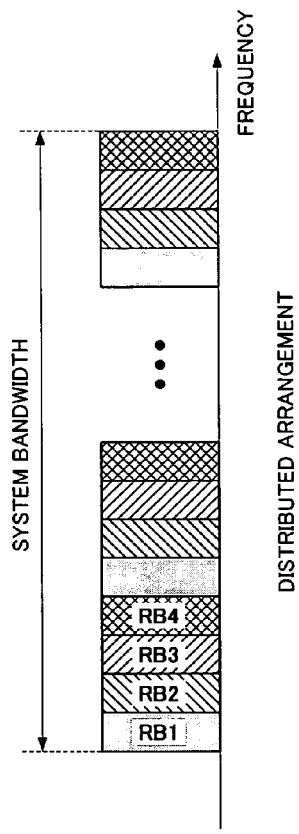
FIGS. 10(A) and 10(B) each shows a signal arrangement method (localized arrangement or distributed arrangement) in a frequency domain.
Figure 10A:
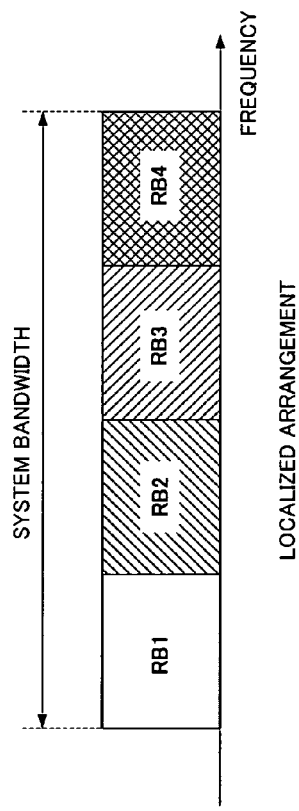
Figure 11:
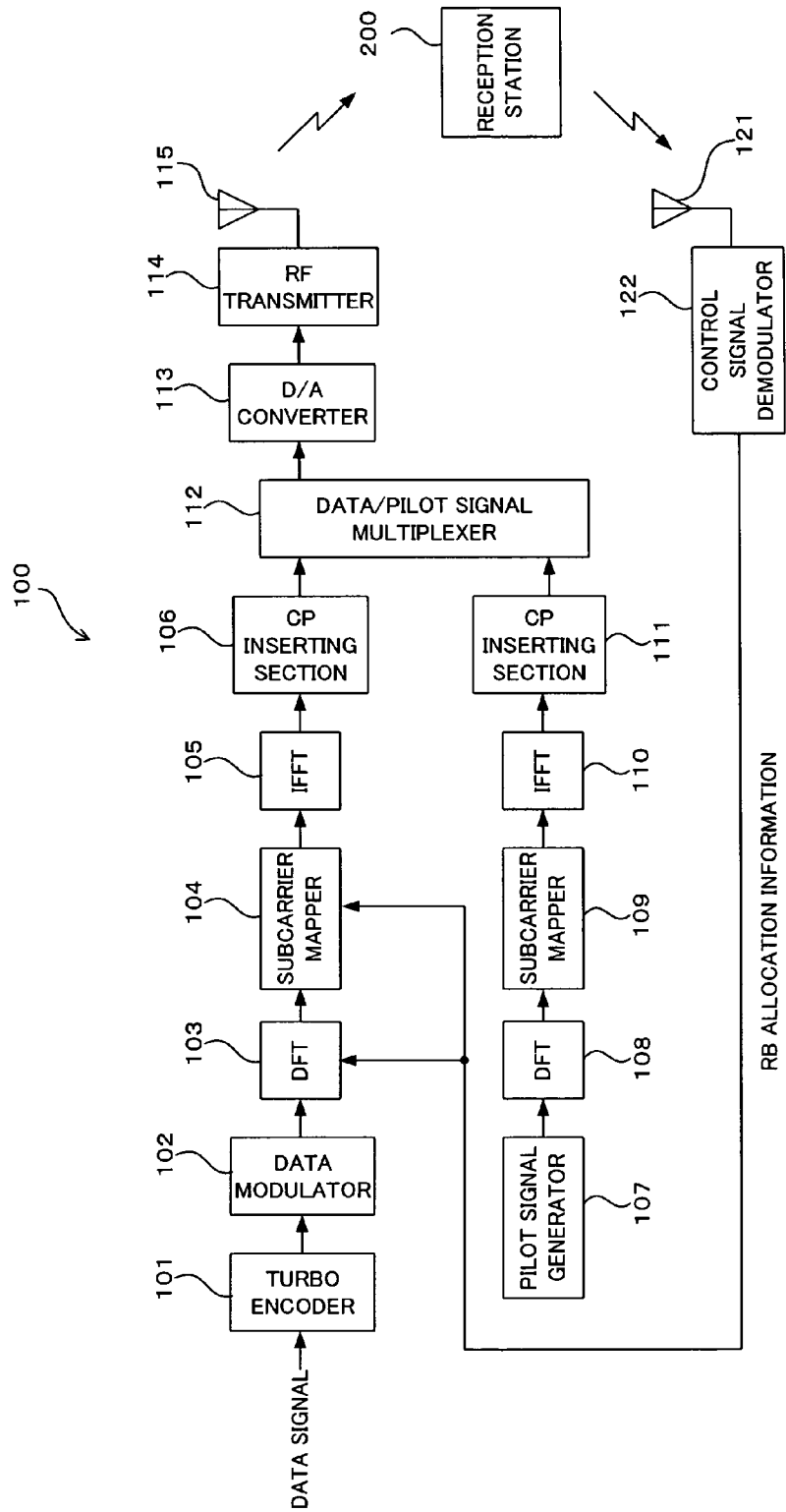
FIG. 11 a functional block diagram taking note of a transmission processing system of a transmission station in an existing mobile communication system.
Figure 12:
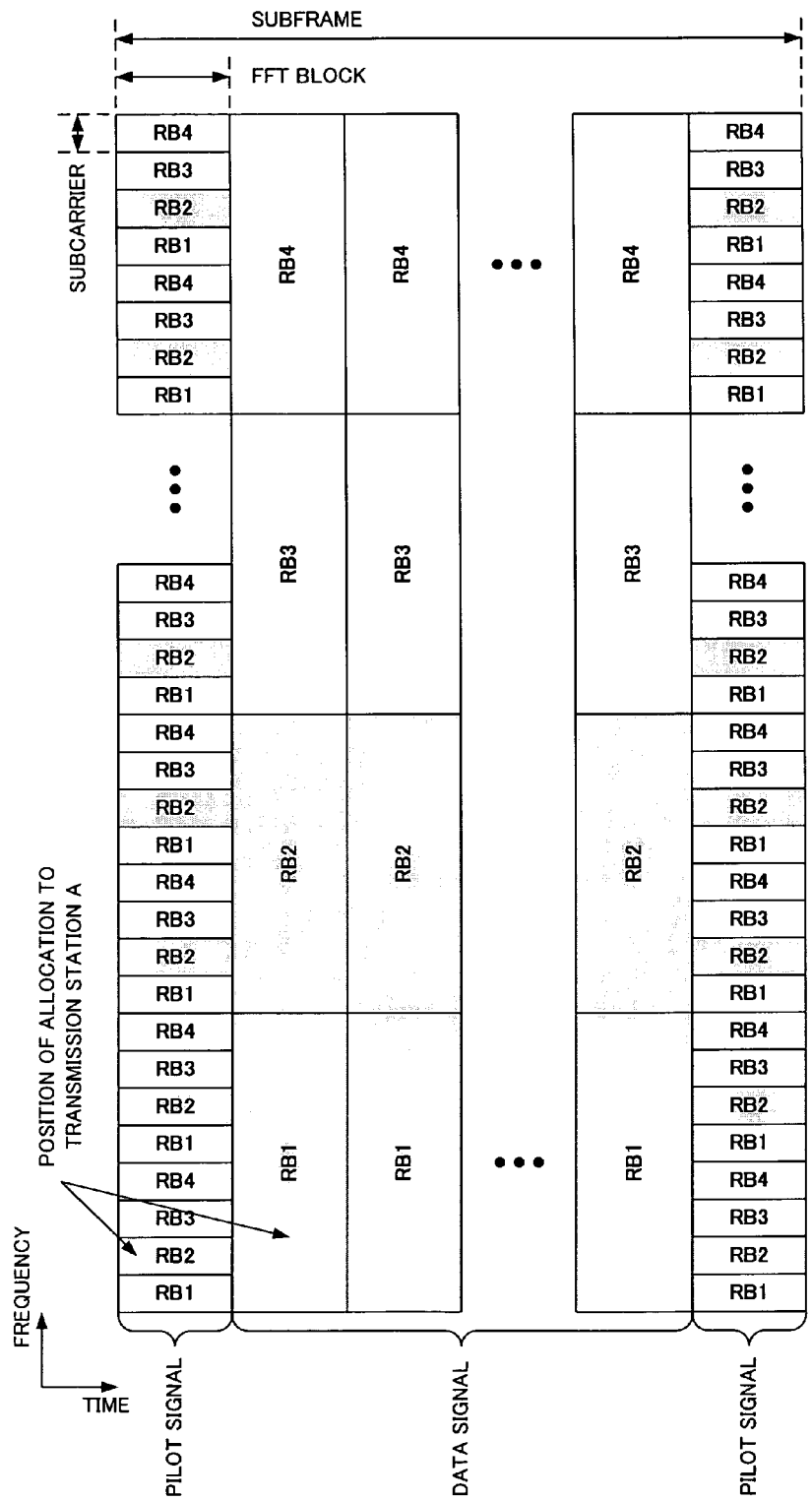
FIG. 12 is an illustration of an example of arrangement of a data signal and pilot signal of a transmission signal in the transmission station shown in FIG. 11 according to time and frequency.
Figure 13:
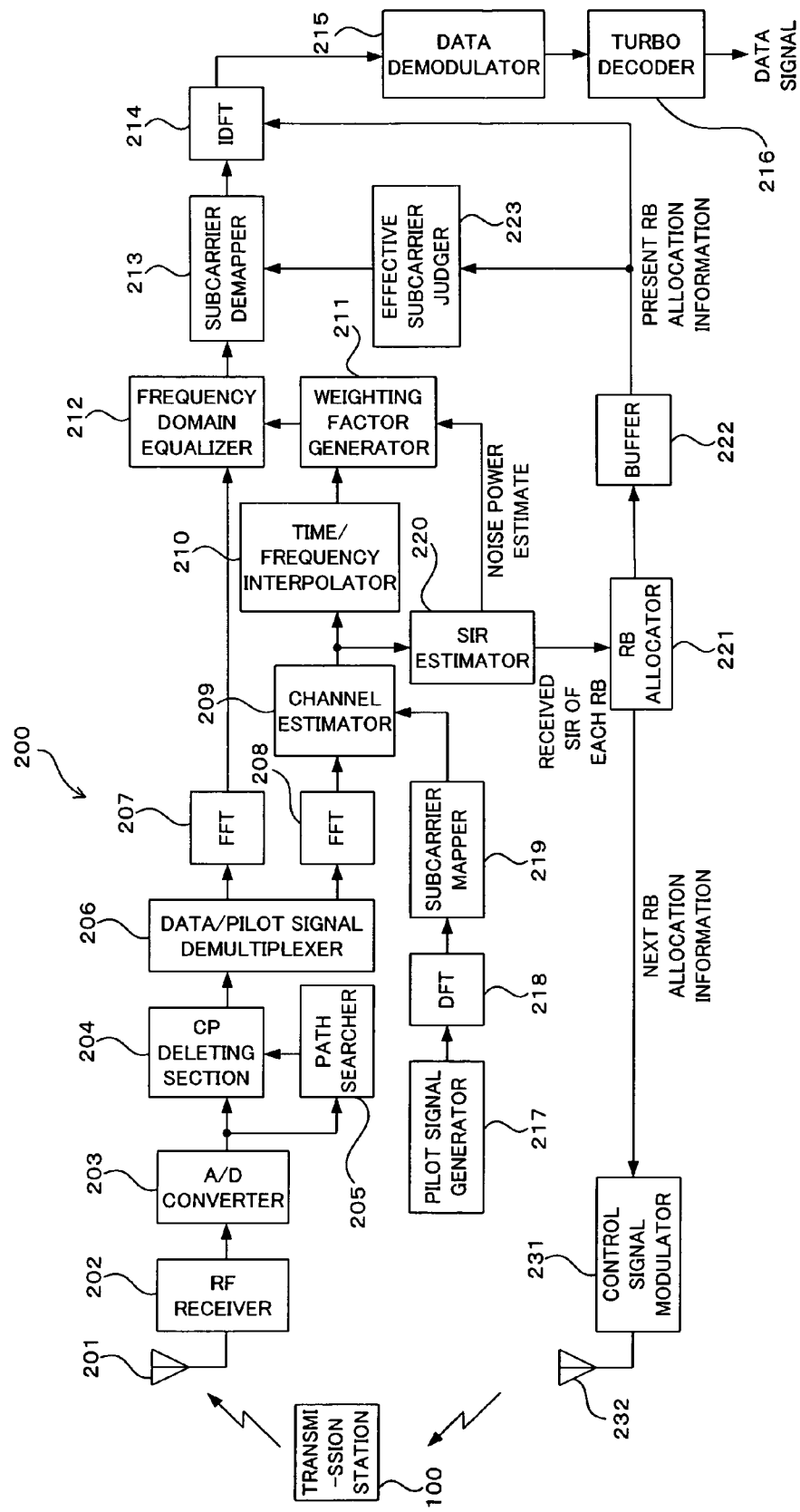
FIG. 13 is a functional block diagram taking note of a reception processing system of a reception station in an existing mobile communication system.

FIGS. 1 and 4 are block diagrams showing, as a radio communication system according to an embodiment of the present invention, a configuration of a system employing a DFT-Spread OFDM which is one of single carrier transmission modes, and FIG. 1 is a functional block diagram taking note of a configuration of a transmission station (radio transmission apparatus) 1 while FIG. 4 is a functional block diagram taking note of a configuration of a reception station (radio reception apparatus) 4. As described above with reference to FIGS. 10(A), 10(B) and 12, this embodiment is also based upon an FDMA communication mode in which a system frequency band is divided by a fixed band (RB) and a data signal is transmitted in units of the bands, the number of which is set arbitrarily, while a pilot signal is transmitted in a distributed arrangement fashion throughout the entire system frequency band. Incidentally, in FIGS. 1 and 4, point-to-point communications are taken between the transmission station 1 and the reception station 4.

(A1) Description of Transmission Station 1

First of all, as shown in FIG. 1, for example, the transmission station 1 comprises, as a transmission processing system, a turbo encoder 11, a data modulator 12, a DFT 13, an RB divider 14, a plurality of ($N_{RBall}$) waveform shaping filters 15-1 to 15-$N_{RBall}$ [PSFp(1) to PSFp($N_{RBall}$)], a subcarrier mapper 16, an IFFT 17, a CP inserting section 18, a pilot signal generator 19, a DFT 20, an RB divider 21, a plurality of ($N_{RBall}$ RBs in total) waveform shaping filters (roll-off filters) 22-1 to 22-$N_{RBall}$ [PSFp (1) to PSFP ($N_{RBall}$)], a subcarrier mapper 23, an IFFT 24, a CP inserting section 25, a data/pilot signal multiplexer 26, a digital/analog (D/A) converter 27, an RF transmitter 28, and a transmission antenna 29. Also in this embodiment, reference numeral 30 designates a reception antenna and numeral 31 depicts a control signal demodulator, each of which is a component of a reception processing system of the transmission station 1.

In this configuration, the control signal demodulator 31 demodulates a control signal feedbacked from the reception station 4 and received through the reception antenna 30 so as to extract RB allocation information. The RB allocation information extracted therefrom is supplied to the DFT 13, the RB divider 14 and the subcarrier mapper 16. Also in this embodiment, the RB allocation information includes the numbers of RBs allocated and RB numbers.

Furthermore, the turbo encoder 11 is for turbo-encoding (error-correction-encoding) a data signal to be transmitted to the reception station 4, and the data modulator 12 is for modulating the data signal turbo-encoded, and the DFT 13 carries out DFT processing in units of symbols corresponding to the RB allocation information (the number of RBs allocated) from the control signal demodulator 31 to convert a data signal in a time domain into a signal in a frequency domain. Also in this embodiment, when the number of subcarriers of an RB is taken as $N_C$ and the number of RBs allocated is taken as $N_{RB}$, the DFT processing is conducted in units of $N_C \times N_{RB}$ symbols.

The RB divider (data signal band dividing section) 14 is for dividing an output data signal from the DFT section 13 into RB units to input them to the waveform shaping filters 15-$i$ (i=1 to $N_{RBall}$). In this case, the data signals with RB numbers, which are an object of instruction for data signal transmission, are inputted to the waveform shaping filters 15-$i$.

Figure 14:
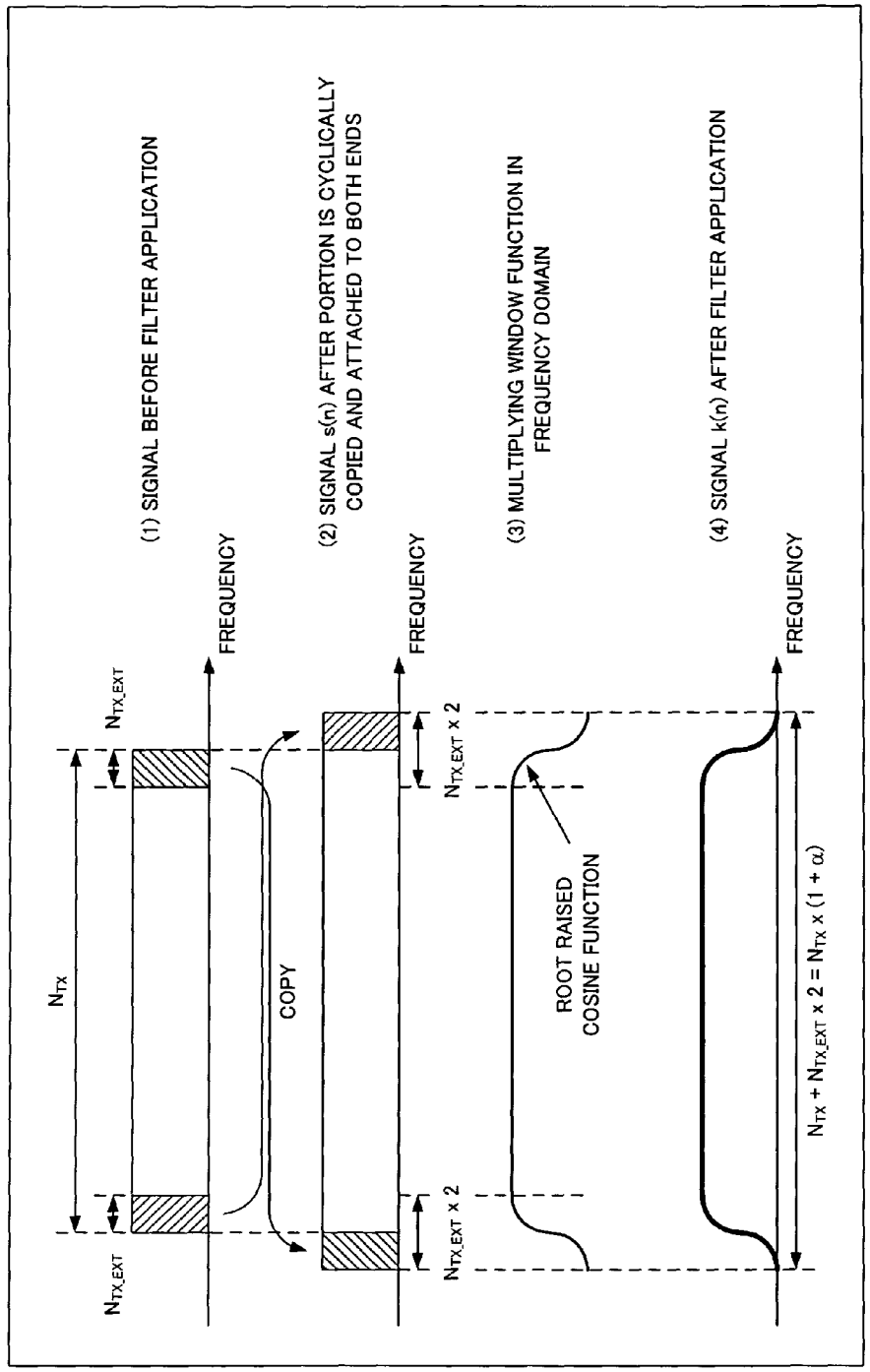
FIG. 14 is an illustration for explaining a processing procedure in a waveform shaping filter to be used in the transmission station shown in FIG. 11 and in the reception station shown in FIG. 13.
Figure 15:
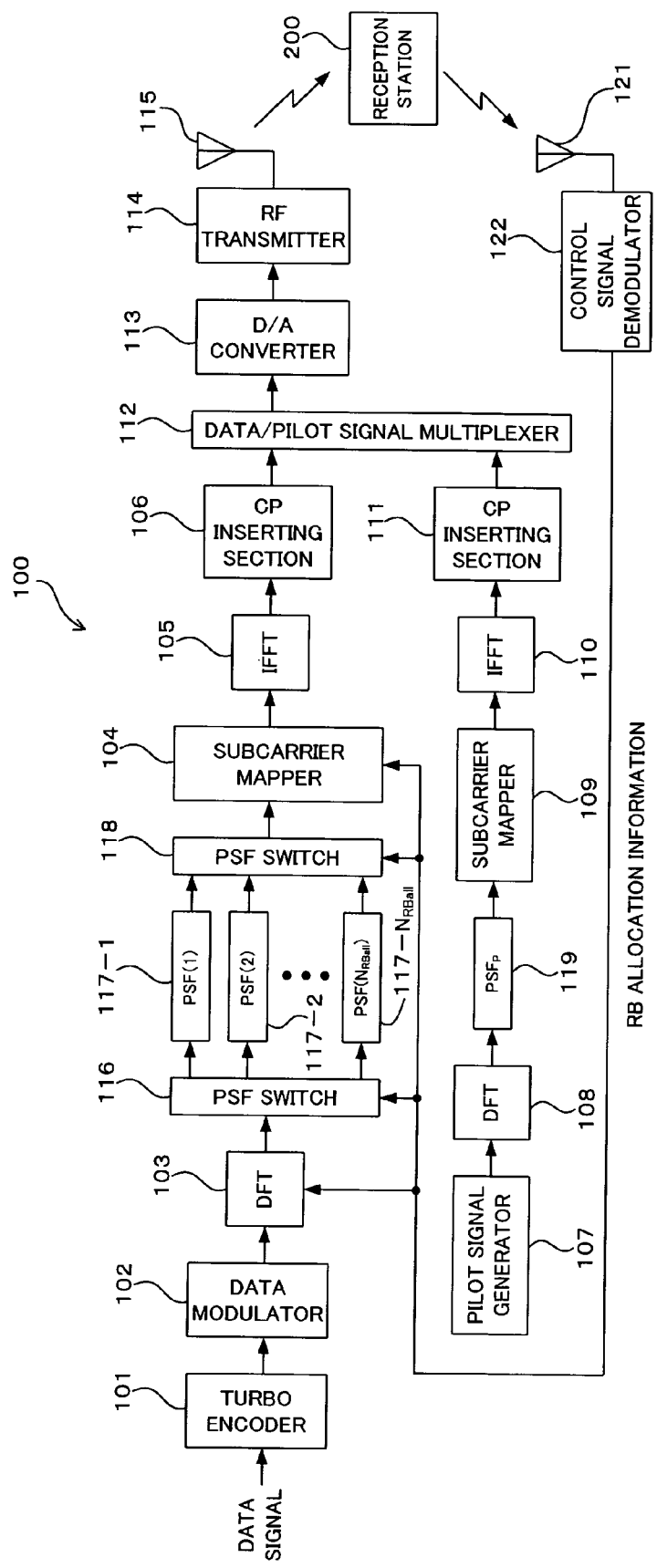
FIG. 15 is a functional block diagram showing an example of configuration in a case in which a waveform shaping filter is applied in the transmission station shown in FIG. 11.
Figure 16:
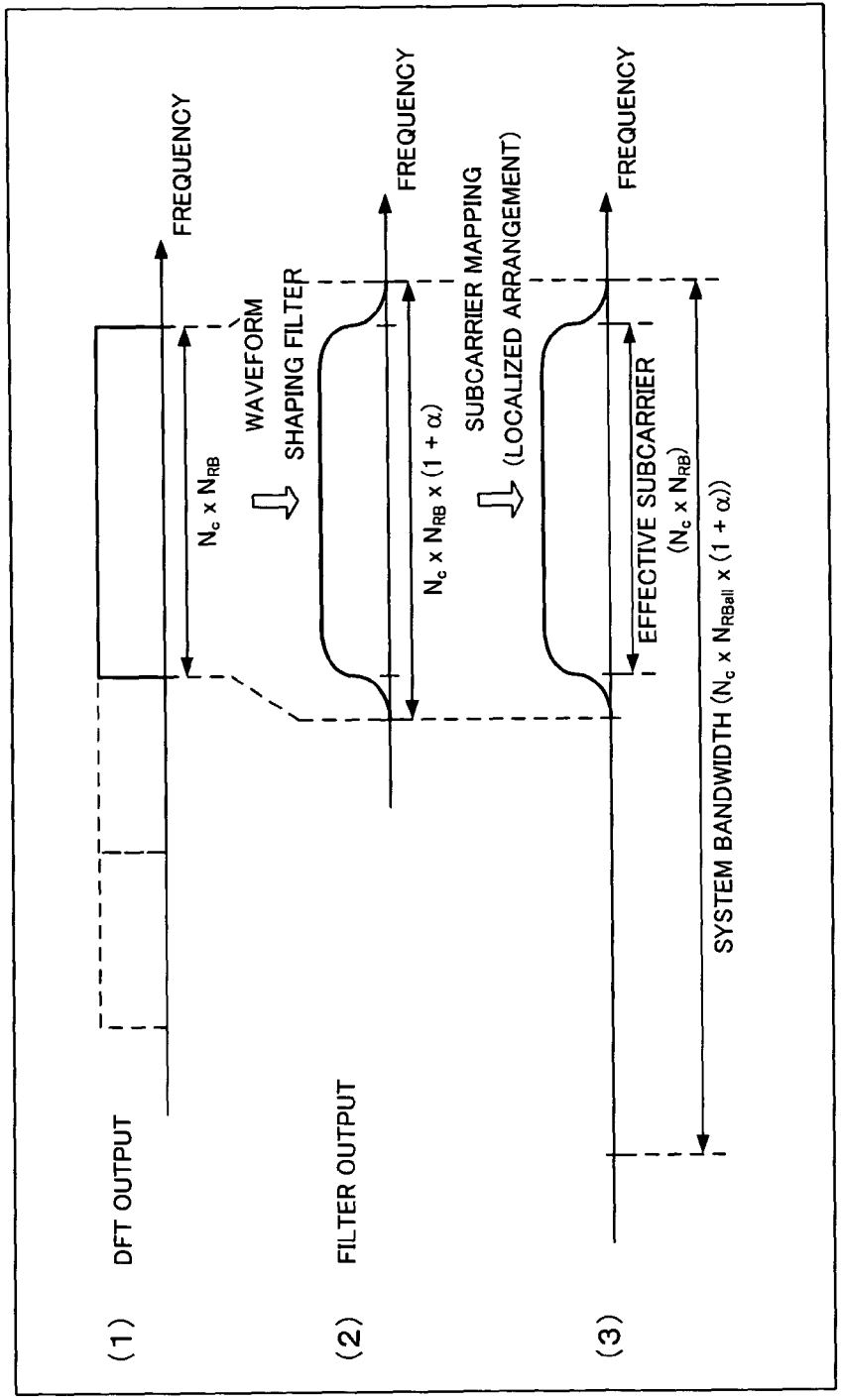
FIG. 16 is an illustration for explaining a method for the application of a waveform shaping filter with respect to a data signal in the transmission station shown in FIG. 15 and a subcarrier mapping (localized arrangement)
Figure 17:
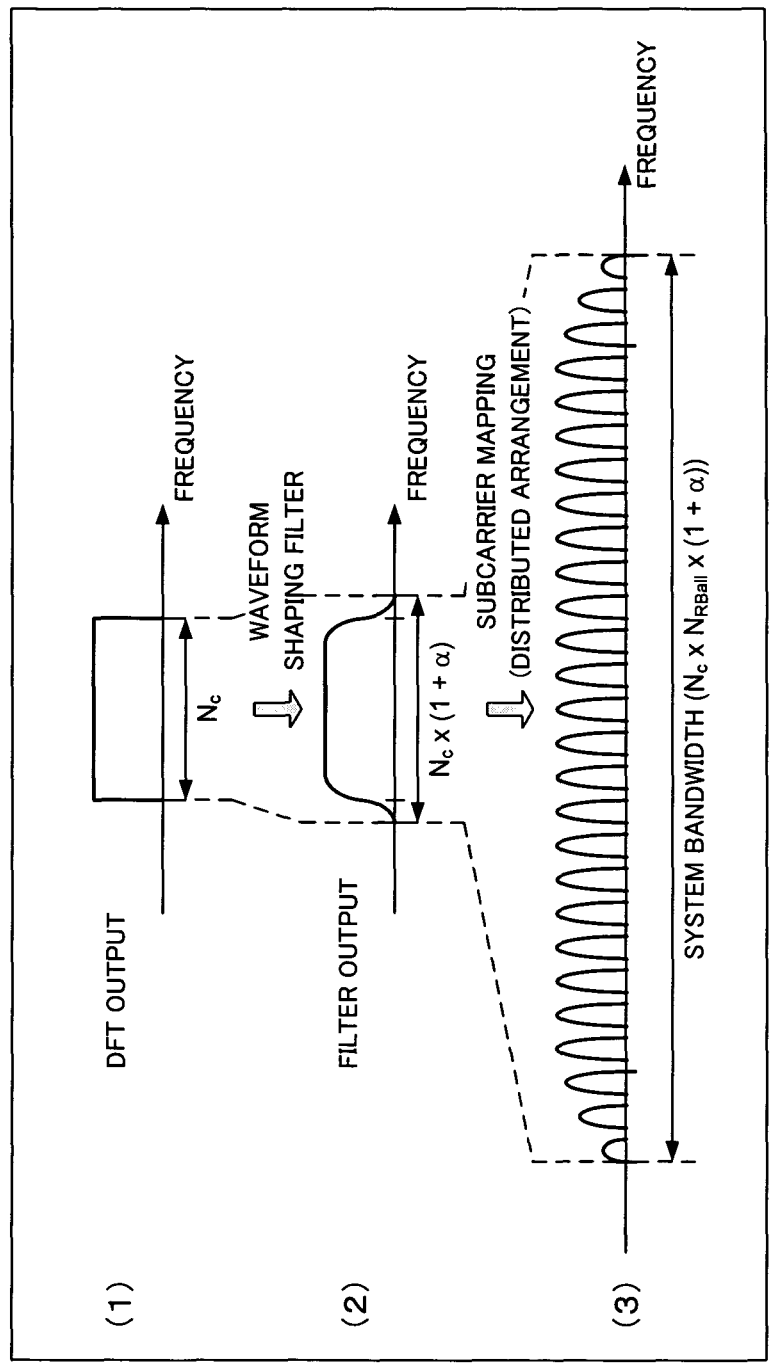
FIG. 17 is an illustration for explaining a method for the application of a waveform shaping filter with respect to a pilot signal in the transmission station shown in FIG. 15 and a subcarrier mapping (distributed arrangement)
Figure 18:
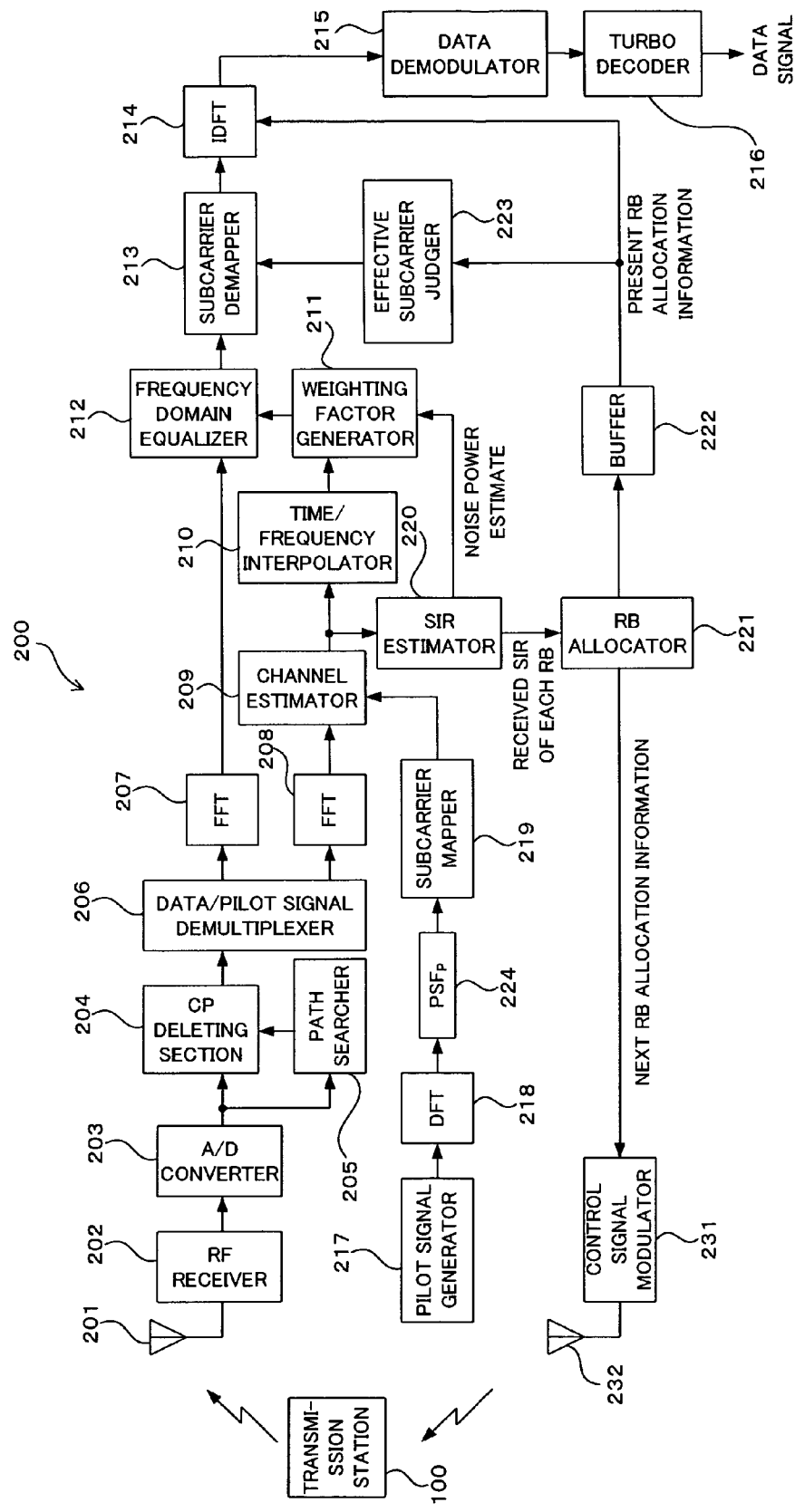
FIG. 18 is a functional block diagram showing a example of configuration in a case in which a waveform shaping filter is applied in the reception station shown in FIG. 13.
Figure 19:
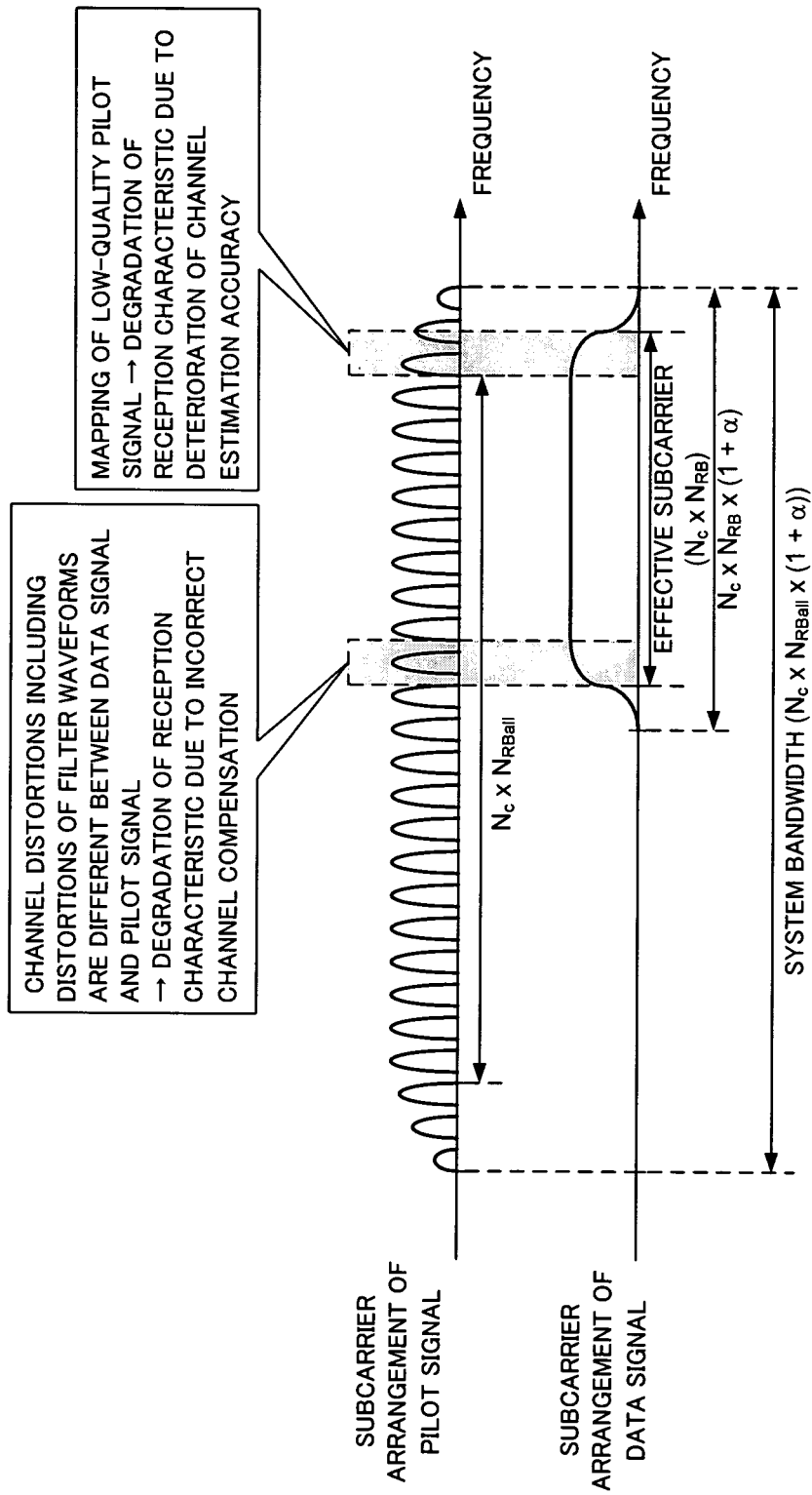
FIG. 19 is an illustration of a comparison between a subcarrier arrangement of a data signal shown in FIG. 16 and a subcarrier arrangement of a pilot signal shown in FIG. 17.

The waveform shaping filters 15-$i$ are of the same types corresponding in number to the total number $N_{RBall}$ of RBs and, as mentioned above with reference to FIGS. 14 and 16, they are designed to carry out the waveform shaping (windowing processing) in a frequency domain, thereby achieving the waveform shaping on a data signal in units of RBs. That is, the waveform shaping filters 15-$i$ each functions as a data signal filtering section to conduct the waveform shaping by applying a filter with a roll-off rate of $\alpha$ in units of divided data signals obtained by the RB divider 14.

The subcarrier mapper (data signal mapper) 16 is for, on the basis of the above-mentioned RB allocation information from the control signal demodulator 31, mapping an output signal after the waveform shaping by the waveform shaping filters 15-$i$ into a subcarrier (divided band in units of RBs which forms a partial band of the system band) under, for example, a localized arrangement in a frequency domain, and the IFFT 17 carries out the IFFT 17 on the signal in the frequency domain, mapped into the subcarrier in this way, thereby conducting re-conversion into a signal in a time domain.

The CP inserting section 18 is made to insert a cyclic prefix (CP) [guard interval (GI)] into an output signal from the aforesaid IFFT 17 in units of samples (FFT blocks).

The pilot signal generator 19 is made to generate a pilot signal to be used for channel compensation for a received data signal in the reception station 4, and the DFT 20 is made to carry out the DFT processing on the pilot signal in units of symbol corresponding to one RB for the conversion into a signal in a frequency domain.

The RB divider (pilot signal band divider) 21 is made to divide the pilot signal after the DFT processing by the aforesaid DFT 20 by the total number ($N_{RBall}$) of RBs, and the waveform shaping filters 22-$i$ are of the same types corresponding in number to the total number $N_{RBall}$ of RBs, and have the same filtering characteristic as that of the waveform shaping filters 15-$i$ with respect to the data signal. Thus, each of the pilot signals after the division into the RB units by the RB divider 21 undergoes the same waveform shaping as the waveform shaping (windowing processing) on the data signal in a frequency domain. That is, the waveform shaping filters 22-$i$ function as a pilot signal filtering section to achieve the waveform shaping by applying a waveform shaping filter with a roll-off rate of $\alpha$ in units of the pilot signals obtained through the division by the RB divider 21.

The subcarrier mapper (pilot signal mapper) 23 is made to, for the purpose of measuring radio channel quality information (CQI) on each RB in the reception station 4, map an output signal from each of the waveform shaping filters 22-$i$ into a subcarrier under a distributed arrangement throughout the entire system frequency band, and the IFFT 24 carries out the IFFT processing on the signal in the frequency domain, mapped under the distributed arrangement in this way, for the re-conversion into a signal in a time domain, and the CP inserting section 25 is made to insert a CP into an output signal from this IFFT 24 in units of samples.

The data/pilot signal multiplexer 26 is made to carry out the time multiplexing between the data signal from the CP inserting section 18 and the pilot signal from the CP inserting section 25, and the D/A converter 27 conducts the D/A conversion on the time-multiplexed signal, and the RF transmitter 28 conducts the quadrature modulation on the D/A converted transmission signal to make a conversion (up-conversion) from a baseband signal into a radio frequency signal, with the transmission signal after the up-conversion being transmitted through the transmission antenna 29 to the reception station 4.

That is, a block composed of the above-mentioned pilot signal generator 19, DFT 20, RB divider 21, waveform shaping filters 22-$i$, subcarrier mapper 23, IFFT 24, CP inserting section 25, data/pilot signal multiplexer 26, D/A converter 27 and RF transmitter 28 functions as a pilot transmission means to transmit a pilot signal through the use of a predetermined frequency band (system band), while a block composed of the above-mentioned turbo encoder 11, data modulator 12, DFT 13, RB divider 14, waveform shaping filters 15-$i$, subcarrier mapper 16, IFFT 17, CP inserting section 18, data/pilot signal multiplexer 26, D/A converter 27 and RF transmitter 28 functions as a data signal transmission means to transmit a data signal through the use of a partial band of the system band.

In addition, a block composed of the above-mentioned RB divider 14, waveform shaping filters 15-$i$, subcarrier mapper 16, RB divider 21, waveform shaping filters 22-$i$ and subcarrier mapper 23 functions as a waveform control means to carry out the waveform shaping on the pilot signal and the data signal, transmitted through the use of at least the aforesaid partial band, by use of filters with the same roll-off rate $\alpha$ so that they have the same shape in a frequency domain. In the following description, the "same roll-off rate $\alpha$" does not require a strict identity but permits not only a difference in a range of error but also a difference in a range of no influence on the data signal demodulation processing capability (channel estimation accuracy and channel compensation accuracy) which will be mentioned later.

A description will be given hereinbelow of an operation of the transmission station 1 thus configured according to this embodiment. First of all, the control signal demodulator 31 demodulates a control signal feedbacked from the reception station 4 and received through the reception antenna 30 to extract RB allocation information. The extracted RB allocation information is supplied to each of the DFT 13, the RB divider 14 and the subcarrier mapper 16.

On the other hand, the data signal to be transmitted is turbo-encoded (error-correction-encoded) in the turbo encoder 11 and, after data-modulated by the data modulator 12, is DFT-processed in units of symbols corresponding to the RB allocation information (the number of RBs allocated) from the control signal demodulator 31 in the DFT 13, thereby conducting a conversion from the signal in the time domain into a signal in the frequency domain. Concretely, for example, when the number of subcarriers of an RB is taken as $N_C$ and the number of RBs allocated is taken as $N_{RB}$, the DFT processing is conducted in units of $N_C \times N_{RB}$ symbols.

Figure 2:
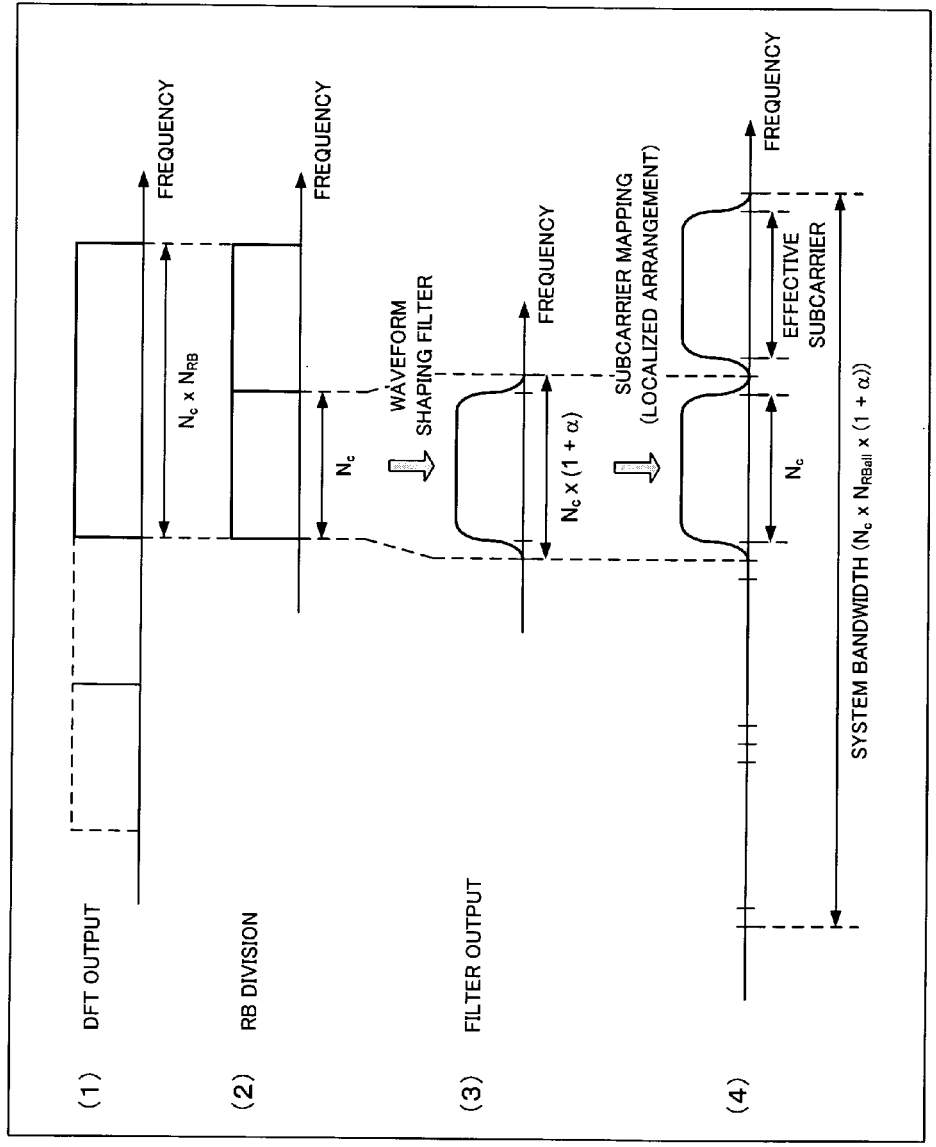
FIG. 2 is an illustration useful for explaining a method for the application of a waveform shaping filter with respect to a data signal in the transmission station shown in FIG. 1 and a subcarrier mapping (localized arrangement)

The data signal [see (1) in FIG. 2] after the DFT processing is divided into RB units on the frequency axis by the RB divider 14 [see (2) in FIG. 2], and the data signals with the RB numbers which are objects of data signal transmission instruction according to the aforesaid RB allocation information are inputted to the corresponding waveform shaping filters 15-$i$.

Each of the waveform shaping filters 15-$i$ carries out the waveform shaping (waveform control step) on the inputted data signals obtained by the division into the RB units through the use of a window function having the same roll-off rate $\alpha$ as mentioned above with reference to FIGS. 14 and 16. Thus, for example, as shown by (3) in FIG. 2, a data signal having an occupied bandwidth of $N_C \times (1+\alpha)$ made wider (spread) than the occupied bandwidth $N_C$ of the data signal before the filter application (employment) according to the roll-off rate $\alpha$ is obtainable as a filter output.

In addition, for example, as shown by (4) in FIG. 2, in the subcarrier mapper 16, the respective data signals after the waveform shaping are mapped into $N_C$ subcarriers (effective subcarriers) under a localized arrangement in a frequency domain of the system bandwidth $N_C \times N_{RBall} \times (1+\alpha)$ on the basis of the aforesaid RB allocation information from the control signal demodulator 31.

The data signals mapped into the subcarriers in this way are IFFT-processed in the IFFT 17 to be again converted into signals in a time domain and, after a CP (GI) is inserted thereinto in units of samples (FFT blocks) in the CP inserting section 18, the data signals is inputted to the data/pilot signal multiplexer 26.

Figure 3:
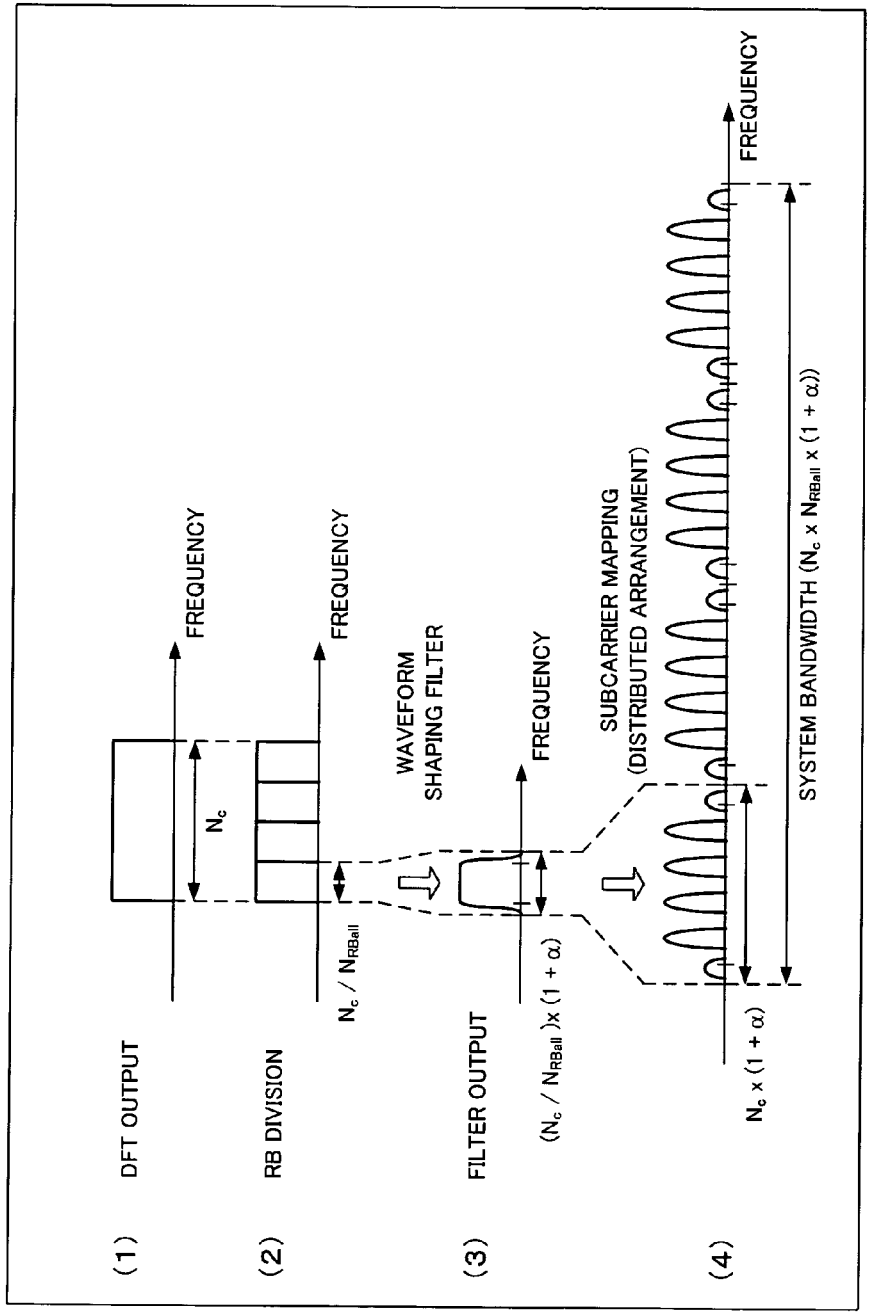
FIG. 3 is an illustration useful for explaining a method for the application of a waveform shaping filter with respect to a pilot signal in the transmission station shown in FIG. 1 and a subcarrier mapping (distributed arrangement)

On the other hand, a pilot signal generated by the pilot signal generator 19 is DFT-processed in units of symbol ($N_C$) corresponding to one RB in the DFT 20 to be converted into a signal in a frequency domain [see (1) in FIG. 3] and is then divided by the total number ($N_{RBall}$) of RBs [see (2) in FIG. 3] in the RB divider 21, with the divided pilot signals being inputted to the waveform shaping filters 22-$i$, respectively.

Each of the waveform shaping filters 22-$i$ carries out the waveform shaping on the pilot signal at the same roll-off rate a as that of the waveform shaping filters 15-$i$ on the data signal (waveform control step). Thus, the same waveform shaping as the waveform shaping on the data signal is conducted with respect to each of the pilot signals obtained by the division into the RB units. In consequence, for example, as shown by (3) in FIG. 3, a data signal having an occupied bandwidth $(N_C/N_{RBall}) \times (1+\alpha)$ made wider than the occupied bandwidth $N_C/N_{RBall}$ of the pilot signal before the filter application according to the roll-off rate $\alpha$ is obtainable as a filter output.

The respective pilot signals [occupied bandwidth per pilot signal=$N_C \times (1+\alpha)$] after waveform-shaped in RB units are mapped into subcarriers under a distributed arrangement throughout the system bandwidth $N_C \times N_{RBall} \times (1+\alpha)$ by the subcarrier mapper 23, for example, as shown by (4) in FIG. 3.

The pilot signals mapped into the subcarriers under a distributed arrangement in this way are then IFFT-processed in the IFFT 24 to be again converted into signals in a time domain and, after a CP is inserted thereinto in units of samples by the CP inserting section 25, they are inputted to the data/pilot signal multiplexer 26.

The data/pilot signal multiplexer 26 time-multiplexes the data signal from the CP inserting section 18 and the pilot signal from the CP inserting section 25, with the time-multiplexed signal being D/A-converted by the D/A converter 27 and quadrature-modulated by the RF transmitter 28 to be converted (up-converted) from a baseband signal into a radio frequency signal and then transmitted through the transmission antenna 29 to the reception station 4.

That is, in the transmission station 1, a pilot signal is transmitted through the use of a predetermined frequency band (pilot transmission step), and a data signal is transmitted through the use of a partial band of this frequency band (data signal transmission step), and the pilot signal and the data signal, transmitted through the use of at least the partial band, are waveform-shaped using filters with the same roll-off rates $\alpha$ so as to have the same configuration in a frequency domain.

(A2) Description of Reception Station 4

On the other hand, for example, as shown in FIG. 4, the reception station 4 comprises, as a reception processing system, a reception antenna 41, an RF receiver 42, an analog/digital (A/D) converter 43, a CP deleting section 44, a path searcher 45, a data/pilot signal demultiplexer 46, FFTs 47, 48, a channel estimator 49, a time/frequency interpolator 50, a weighting factor generator 51, a frequency domain equalizer 52, a subcarrier demapper 53, an IDFT 54, a data demodulator 55, a turbo decoder 56, a pilot signal generator 57, a DFT 58, an RB divider 59, a plurality of ($N_{RBall}$) waveform shaping filters (roll-off filters) 60-1 to 60-$N_{RBall}$ [PSFp (1) to PSFp ($N_{RBall}$)], a subcarrier mapper 61, an SIR estimator 62, an RB allocator 63, a buffer 64, and an effective subcarrier judger 65. Moreover, reference numeral 71 denotes a control signal modulator and numeral 72 represents a transmission antenna, each of which is a component of a transmission processing system of the reception station 4.

In this configuration, the RF receiver 42 is made to convert (down-convert) a signal with a radio frequency, transmitted from the transmission station 1 and received through the reception antenna 41, into a baseband signal for the quadrature demodulation, and the A/D converter 43 is made to A/D-convert the received baseband signal from the RF receiver 42, and the path searcher 45 is made to carry out the correlative operation between an output signal from the A/D converter 43 and a transmission pilot replica in a time domain for detecting a reception timing (starting point of an effective signal component) of each path.

The CP deleting section 44 deletes the CP from the received signal on the basis of the reception timing information detected by the aforesaid path searcher 45 to extract an effective signal component, and the data/pilot signal demultiplexer 46 demultiplexes the effective signal component from the CP deleting section 44 into the data signal and the pilot signal, which have been in the time-multiplexed condition, with the data signal being inputted to the FFT 47 and the pilot signal being inputted to the FFT 48.

The FFT 47 is for carrying out the FFT processing on the data signal from the data/pilot signal demultiplexer 46 to make a conversion from a signal in the time domain into a signal in the frequency domain, and the FFT 48 conducts the FFT processing on the pilot signal from the data/pilot signal demultiplexer 46 to make a conversion from a signal in the time domain into a signal in the frequency domain.

The pilot signal generator 57 is for generating a transmission pilot replica in the time domain, and the DFT 58 is for conducting the DFT processing on this pilot replica to make a conversion from a signal in the time domain into a signal in the frequency domain, and the RB divider 59 is, similar to the transmission station 1 side, for dividing the pilot signal after the DFT processing by the total number ($N_{RBall}$) of RBs, with the divided signals being respectively inputted to the waveform shaping filters 60-$i$.

Each of the waveform shaping filters (waveform control means) 60-$i$ is equal to the waveform shaping filters 22-$i$ in the transmission station 1 and is made to carry out the waveform shaping (windowing processing), which is the same as that on the transmission station 1 side, on the pilot replicas obtained through the division into RB units by the RB divider 59 (i.e., divided bands with which the data signals are transmitted) in the frequency domain.

The subcarrier mapper 61 is made to map the pilot replicas after the waveform shaping by the respective waveform shaping filters 60-$i$ into subcarriers under the same subcarrier arrangement (distributed arrangement) as that of the transmission station 1 side.

The channel estimator 49 carries out the correlative operation between the received pilot signal from the FFT section 48 and the pilot replica from the subcarrier mapper 61 so as to estimate a channel distortion of the frequency domain in a radio channel (that is, to obtain a channel estimate).

The SIR estimator 62 estimates a received SIR with respect to each RB for the data signal on the basis of the channel estimate obtained by the channel estimator 49 and further calculates a noise power estimate to be used in the weighting factor generator 51 which will be mentioned later. As an example of the former SIR estimating method, also in this embodiment, through the use of a channel estimate of a subcarrier where the target pilot signal of the transmission station 1 is disposed for each RB for the data signal, the sum of the square of a real number of the channel estimate expressed by a complex number and the square of an imaginary number thereof is considered to be a desired signal component S and a variance of a plurality of symbols is regarded as an interference signal power I, and the ratio of S and I is set as a received SIR estimate. Moreover, the latter noise power estimate can be calculated by averaging the interference powers I of the respective RBs for the data signal, obtained in the process of acquiring the received SIR estimate, between the RBs.

The RB allocator 63 is made to allocate RBs for the next transmission of a data signal from the transmission station 1 by use of the received SIR estimates of the respective RBs for the data signal and, also in this embodiment, as the allocation method, it is possible to employ a method of allocating an RB whose received SIR estimate exceeds a specified threshold, or other methods.

The time/frequency interpolator 50 is made to carry out the interpolation processing (linear interpolation or the like) in a time direction and in a frequency direction by use of the channel estimates of portions of subcarriers and FFT blocks in a subframe, obtained by the channel estimator 49, thereby calculating the channel estimates of all the subcarriers and all the FFT blocks in the subframe.

The weighting factor generator 51 is made to calculate an MMSE weight as a weighting factor to be used for the frequency domain equalization (channel compensation) in the frequency domain equalizer 52 which will be mentioned later. For example, with respect to specified subcarriers and FFT blocks, when a channel estimate is taken as H and a noise power estimate is taken as $N^2$, the MMSE weight W is given by the above-mentioned equation (1).

On the other hand, the FFT 47 for the received signal carries out the FFT processing on the data signal from the data/pilot signal demultiplexer 46 to make a conversion from a signal in the time domain into a signal in the frequency domain, and the frequency domain equalizer 52 conducts the frequency domain equalization (channel compensation) by use of the weighting factor (MMSE weight), generated by the weighting factor generator 51, with respect to the data signal after the FFT processing. Concretely, with respect to specified subcarriers and FFT blocks, a channel compensation is made by multiplying a received data signal by the aforesaid MMSE weight corresponding thereto.

The effective subcarrier judger 65 makes a judgment on a position of an effective subcarrier, where a data signal is disposed, by use of the RB allocation information from the RB allocator 63, held in the buffer 64, and the subcarrier demapper 53 extracts a signal of an RB, where the target data signal of the transmission station 1 is disposed, from a received signal of each FFT block after the frequency domain equalization by the frequency domain equalizer 52 on the basis of the information on the effective subcarrier judged by the effective subcarrier judger 65. However, the judgment on the position of the effective subcarrier where the data signal is disposed is made in consideration of the fact that the occupied bandwidth of the data signal is made wider by the application (employment) of the waveform shaping filters 15-$i$ in the transmission station 1 as mentioned above with reference to FIG. 2.

The IDFT 54 is made to carry out the IDFT processing on the data signal in the frequency domain from the aforesaid subcarrier demapper 53 to make a conversion into a signal in the time domain, and the data demodulator 55 is made to demodulate this data signal in the time domain, and the turbo decoder 56 is made to conduct the turbo decoding (error correction decoding) on the data signal after the demodulation.

That is, a block composed of the above-mentioned channel estimator 49, time/frequency interpolator 50, weighting factor generator 51, frequency domain equalizer 52, subcarrier demapper 53, IDFT 54, data demodulator 55, turbo decoder 56, SIR estimator 62, RB allocator 63, buffer 64 and effective subcarrier judger 65 functions as a demodulation means to carry out the demodulation processing on a data signal in a divided band of RB unit on the basis of a pilot replica and a received pilot signal after the above-mentioned waveform shaping.

The control signal modulator 71 is for mapping the RB allocation information, obtained by the RB allocator 63 and used for the next transmission of a data signal from the transmission station 1, into a control signal, with this control signal being feedbacked through the transmission antenna 72 to the transmission station 1.

A description will be given hereinbelow of an operation of the reception station 4 thus configured according to this embodiment. A radio frequency signal transmitted from the transmission station 1 is received by the reception antenna 41 and converted (down-converted) into a baseband signal in the RF receiver 42 to be quadrature-demodulated and, after A/D-converted in the A/D converter 43, inputted to the CP deleting section 44 and the path searcher 45.

The path searcher 45 performs the correlative operation between a signal from the A/D converter 43 and a transmission pilot replica in a time domain to detect a reception timing (starting point of effective signal component of each path.

The CP deleting section 44 deletes a CP from a received signal on the basis of the reception timing information detected by the path searcher 45 to extract an effective signal component. In the data/pilot signal demultiplexer 46, the extracted effective signal component is demultiplexed into the data signal and the pilot signal which have been in a time-multiplexed condition, with the data signal being inputted to the FFT 47 and the pilot signal being inputted to the FFT 48.

The FFT 47 conducts the FFT processing on the data signal from the data/pilot signal demultiplexer 46 to make a conversion from a signal in the time domain into a signal in the frequency domain and, likewise, the FFT 48 conducts the FFT processing on the pilot signal from the data/pilot signal demultiplexer 46 to make a conversion from a signal in the time domain into a signal in the frequency domain.

Meanwhile, the pilot signal generator 57 generates a transmission pilot replica in a time domain (pilot replica generating step), and this pilot replica is DFT-processed in the DFT 58 for the conversion from a signal in the time domain into a signal in the frequency domain and, as well as the transmission station 1 side, it is divided by the total number ($N_{RBall}$) of RBs in the RB divider 59, with the divided signals being respectively inputted to the waveform shaping filters 60-$i$.

The waveform shaping filters 60-$i$ respectively carry out the waveform shaping, which is the same as that of the transmission station 1 side, on the pilot replicas obtained by the division in RB units by the RB divider 59 through the use of window functions having the same roll-off rate $\alpha$ as that of the waveform shaping filters 22-$i$ in the transmission station 1 (waveform control step).

The pilot replicas after the waveform shaping are used for the following data signal demodulation processing (demodulation step). That is, the pilot replicas are mapped into subcarriers under the same subcarrier arrangement (distributed arrangement) as that of the transmission station 1 side in the subcarrier mapper 61 and then inputted to the channel estimator 49.

The channel estimator 49 carries out the correlative operation between the received pilot signal from the FFT 48 and the pilot replica from the subcarrier mapper 61 in the frequency domain to estimate a channel distortion of the frequency domain in the radio channel (that is, to obtain a channel estimate).

The obtained channel estimate is inputted to the time/frequency interpolator 50 and the SIR estimator 62. On the basis of the channel estimate, the SIR estimator 62 estimates a received SIR with respect to each RB for the data signal, and calculates a noise power estimate to be used in the weighting factor generator 51, with the received SIR estimate being inputted to the RB allocator 63 and the noise power estimate being inputted to the weighting factor generator 51.

The RB allocator 63 allocates an RB to be used for the next data signal transmission from the transmission station 1 by use of the received SIR estimate of each RB for the data signal from the SIR estimator 62. The time/frequency interpolator 50 carries out the interpolation processing (linear interpolation or the like) in a time direction and in a frequency direction on the basis of the channel estimates of portions of subcarriers and FFT blocks in a subframe, obtained by the channel estimator 49, thereby calculating the channel estimates of all the subcarriers and all the FFT blocks in the subframe.

The weighting factor generator 51 is made to calculate an MMSE weight W as a weighting factor to be used for the frequency domain equalization (channel compensation) in the frequency domain equalizer 52 according to, for example, the above-mentioned equation (1), with the MMSE weight W being outputted to the frequency domain equalizer 52.

The frequency domain equalizer 52 conducts the frequency domain equalization (channel compensation) on the received data signal, FFT-processed in the FFT 47, by use of the weighting factor (MMSE weight) W produced by the weighting factor generator 51.

Moreover, the effective subcarrier judger 65 makes a judgment on a position of an effective subcarrier, where a data signal is disposed, by use of the present RB allocation information from the RB allocating section 63, held in the buffer 64, and this effective subcarrier information is outputted to the subcarrier demapper 53.

The subcarrier demapper 53 extracts a signal of an RB, where the target data signal of the transmission station 1 is disposed, from a received signal of each FFT block after the frequency domain equalization by the frequency domain equalizer 52 on the basis of the information on the effective subcarrier judged by the effective subcarrier judger 65.

The data signal extracted by the subcarrier demapper 53 is IDFT-processed in the IDFT 54 for a conversion from a signal in the frequency domain into a signal in the time domain and then data-demodulated in the data demodulator 55 and turbo-decoded (error-correction-decoded) in the turbo decoder 56, thereby restoring the transmitted data signal from the transmission station 1.

That is, in the reception station 4, a replica of the pilot signal transmitted from the transmission station 1 is produced (pilot replica generating step), and the produced pilot replica is waveform-shaped in at least a partial band (divided band) of the system band through the use of the waveform shaping filters 60-$i$ having a roll-off rate α (waveform control step), and the demodulation processing on the received data signal in the aforesaid partial band is conducted on the basis of the waveform-shaped pilot replica and the pilot signal received from the transmission station 1 (demodulation step).

The allocation information on RBs allocated by the RB allocator 63, which is to be used for the next data signal transmission from the transmission station 1, is mapped into a control signal, directed at the transmission station 1, by the control signal modulator 71 and is then feedbacked through the transmission antenna 72 to the transmission station 1.

Figure 5:
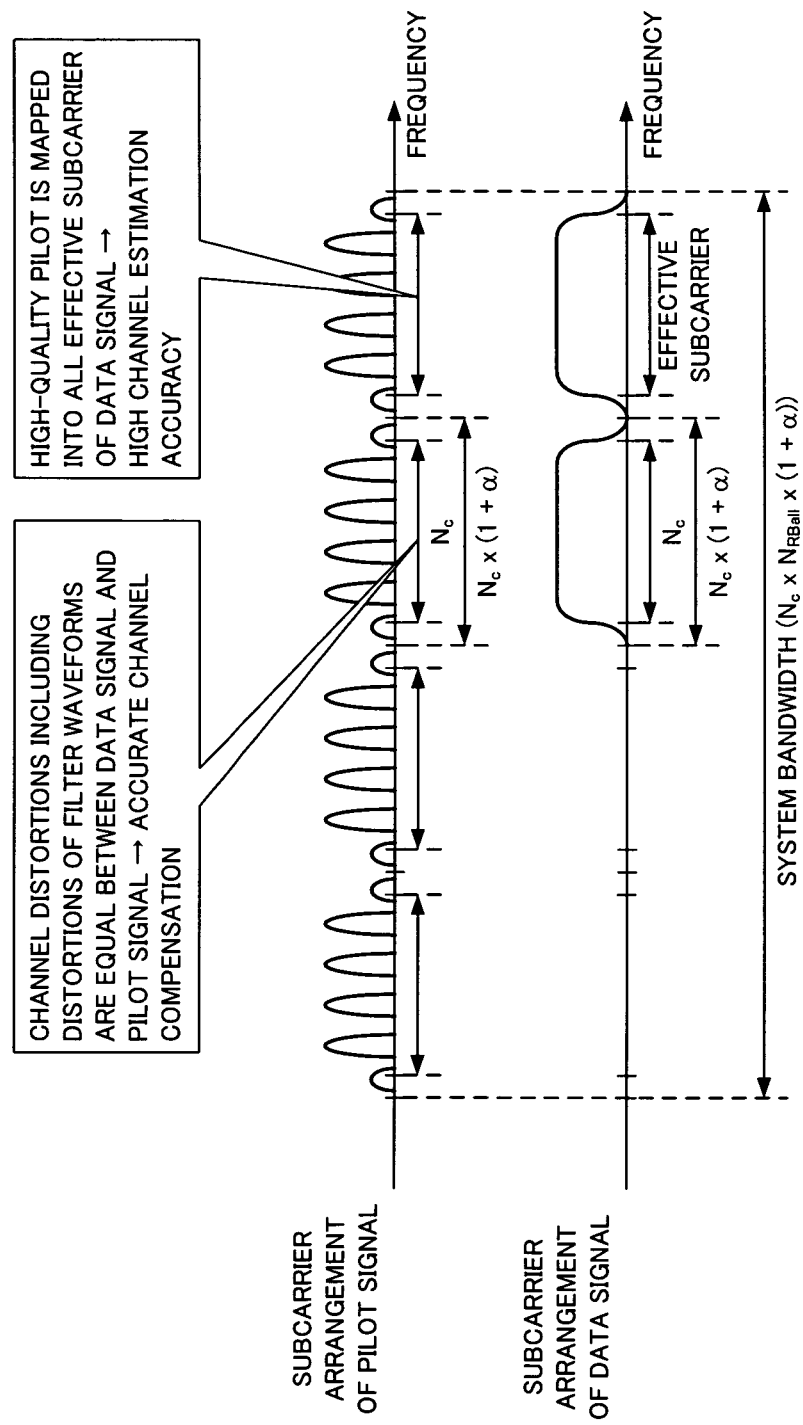
FIG. 5 is an illustration of a comparison between a subcarrier arrangement of a data signal shown in FIG. 2 and a subcarrier arrangement of a pilot signal shown in FIG. 3.

FIG. 5 is an illustration of a comparison between a subcarrier arrangement of a data signal shown in FIG. 2 and a subcarrier arrangement of a pilot signal shown in FIG. 3.

As shown in FIG. 5, in this example, even in a case in which the subcarrier mapping method or the number of DFT output samples differs, the waveform shaping filters 15-$i$ and 22-$i$, which have the same roll-off rate a, are applied with respect to a data signal and a pilot signal in a partial band (divided band of an RB unit) of the system band in terms of the same band (RB) unit. Therefore, a high-quality (S/N) pilot signal whose amplitude does not attenuate due to the waveform shaping filter 15-$i$ is mapped with respect to all the effective subcarriers of the data signal, which improves the channel estimation accuracy in the channel estimator 49. Moreover, the channel distortions due to devices including the waveform shaping filters 15-$i$ and 22-$i$ become equal between the data signal and the pilot signal, which improves the accuracy of the channel compensation in the frequency domain equalizer 52.

That is, it is possible to enhance the demodulation processing capability while suppressing the PAPR of a transmission signal irrespective of RB allocation variations, thereby improving the reception characteristics.

Moreover, in this embodiment, since the waveform shaping on a data signal and pilot signal in an RB unit (partial band) is conducted in a frequency domain, the waveform shaping on an arbitrary band is easily realizable.

[B] Description of Modification

Figure 6:
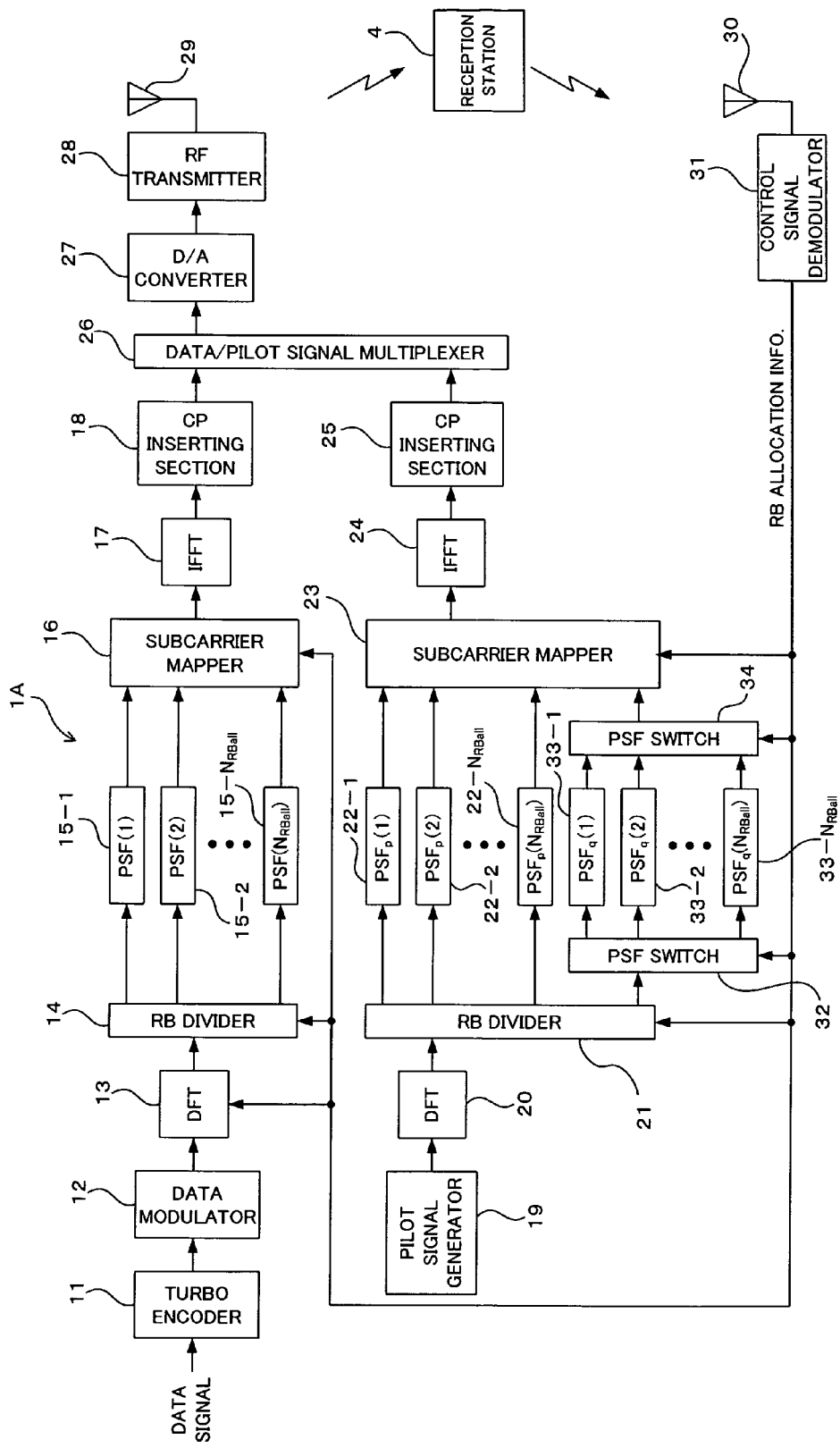
FIG. 6 is a functional block diagram showing a modification of the transmission station shown in FIG. 1.

FIG. 6 is a functional block diagram showing a modification of the transmission station described above with reference to FIG. 1 and FIG. 8 is a functional block diagram showing a modification of the reception station described above with reference to FIG. 4. The transmission station (radio transmission apparatus) 1A shown in FIG. 6 differs from the transmission station 1 shown in FIG. 1 in that PSF switches 32, 34 and a plurality of ($N_{RBall}$) waveform shaping filters 33-1 to 33-$N_{RBall}$ [PSFq(1) to PSFq($N_{RBall}$)] are additionally provided between an RB divider 21 and a subcarrier mapper 23 with respect to a pilot signal. Moreover, the reception station 4A shown in FIG. 8 differs from the reception station 4 shown in FIG. 4 in that, as well as the transmission station 1A side, PSF switches 66, 68 and a plurality of ($N_{RBall}$) waveform shaping filters 67-1 to 67-$N_{RBall}$ [PSFq(1) to PSFq($N_{RBall}$)] are additionally provided between an RB divider 59 and a subcarrier mapper 61 with respect to a pilot replica. Unless otherwise specified particularly, the other components marked with the same reference numerals as those used above are the same as or correspond to the components mentioned above.

In this configuration, in the transmission station 1A, the PSF switch 32 undergoes the switching of input/output on the basis of the RB allocation information from the control signal demodulator 31 so that, of divided pilot signals obtained by dividing a pilot signal by the total number ($N_{RBall}$) of RBs in the RB divider 21, a pilot signal of an arbitrary (any one) RB can be inputted to an arbitrary (any one) waveform shaping filter 33-$i$ ($i=1$ to $N_{RBall}$) In this modification, a pilot signal corresponding to an RB (divided band) to which an effective data signal is not allocated is inputted to one waveform shaping filter 33-$i$ on the basis of the aforesaid RB allocation information and, hence, the pilot signals corresponding to two or more RBs adjacent to each other (existing continuously) in a frequency domain are collectively waveform-shaped in continuously existing frequency bands (that is, as one band).

The waveform shaping filters 33-$i$ handle different frequency bands of a system frequency band, respectively, and are designed to, for example, in a state where an occupied bandwidth of an RB of a data signal is set as a minimum unit, collectively waveform-shape signals of different frequency bands adjacent to each other with respect to this unit in the frequency domain through the use of window functions with the same roll-off rate α.

The PSF switch 34 undergoes the switching of input/output on the basis of the aforesaid RB allocation information in synchronism with the PSF switch 32 so as to output the pilot signals after the waveform shaping by the respective waveform shaping filters 33-$i$ to the subcarrier mapper 23.

That is, in the transmission station 1A according to this modification, after the pilot signal DFT-processed by the DFT 20 is divided by total number ($N_{RBall}$) of RBs in the RB divider 21, the waveform shaping filters 22-$i$ are applied with respect to the pilot signals corresponding to RBs, to which effective data signals are allocated on the basis of the aforesaid RB allocation information, in units of division, while appropriate waveform shaping filters 33-$i$ are applied with respect to the pilot signals of two or more RBs adjacent to each other, to which the effective data signals are not allocated, in a manner such that the PSF switches 32 and 34 undergo the switching operations in synchronism with each other, thus enabling the filters 33-$i$ with the same roll-off rate to be applied collectively in continuously existing frequency bands.

Figure 7:
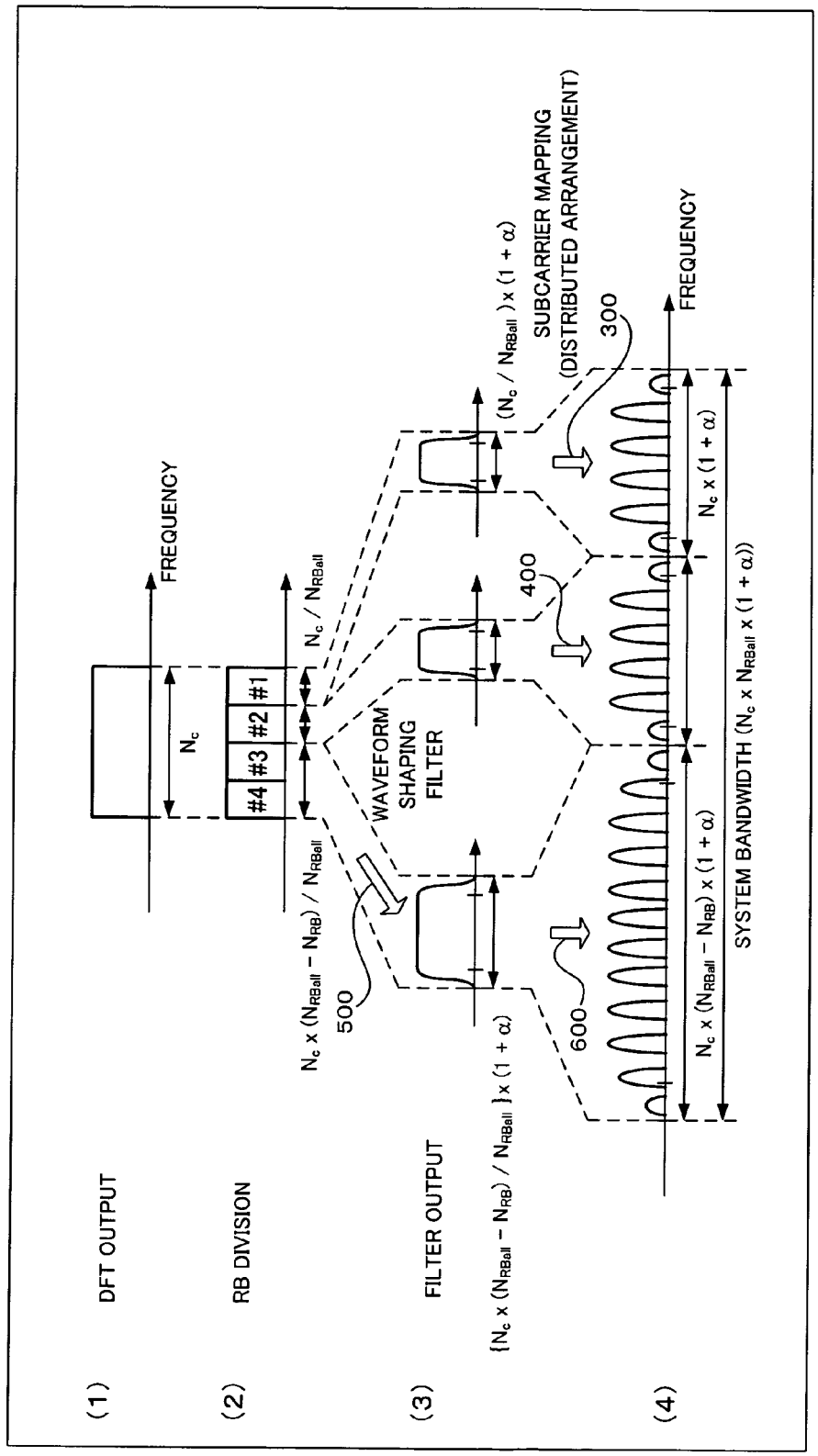
FIG. 7 is an illustration useful for explaining a method for the application of a waveform shaping filter with respect to a pilot signal in the transmission station shown in FIG. 6 and a subcarrier mapping (distributed arrangement)

Therefore, for example, the pilot signal DFT-processed in a symbol unit of the number of subcarriers=$N_C$ as shown by (1) in FIG. 7 is divided into, for example, RB units #1, #2, #3 and #4 as shown by (2) in FIG. 7, and in a case in which the effective data signals corresponding to the pilot signals of RB #1 and RB #2 exist and no effective data signals corresponding to the pilot signals of RB #3 and RB #4 exist, the waveform shaping filters 22-$i$ are applied with respect to the pilot signals of RB #1 and RB #2 as well as the above-described embodiment so that the pilot signals each having an occupied bandwidth $(N_C/N_{RBall}) \times (1+\alpha)$ wider than the occupied bandwidth $N_C/N_{RBall}$ of the pilot signal before the filter application are obtained as filter outputs as shown by (3) in FIG. 7 and subcarrier-mapped with respect to the occupied bandwidth $N_C \times (1+\alpha)$ of the system bandwidth bandwidth $N_C \times N_{RBall} \times (1+\alpha)$ under a distributed arrangement in the subcarrier mapper 23 as shown by (4) in FIG. 7 (see arrows 300 and 400).

On the other hand, the pilot signals of RB #3 and RB #4 are inputted through the PSF switch 32 to the waveform shaping filters 33-$i$ corresponding to the total occupied band width $N_C \times (N_{RBall} - N_{RB})/N_{RBall}$ of these two pilot signals of RB #3 and RB #4 and collectively waveform-shaped with respect to this bandwidth. Accordingly, for example, as shown by (3) in FIG. 7, a pilot signal having an occupied bandwidth $\{N_C \times (N_{RBall} - N_{RB})/N_{RBall}\} \times (1+\alpha)$ wider than the occupied bandwidth $N_C \times (N_{RBall} - N_{RB})/N_{RBall}$ of the pilot signal before the filter application is obtained as a filter output (see arrow 500) and, as shown by (4) in FIG. 7, it is subcarrier-mapped with respect to the occupied bandwidth $\{N_C \times (N_{RBall} - N_{RB})/N_{RBall}\} \times (1+\alpha)$ of the system bandwidth $N_C \times N_{RBall} \times (1+\alpha)$ under a distributed arrangement in the subcarrier mapper 23 (see arrow 600).

Figure 8:
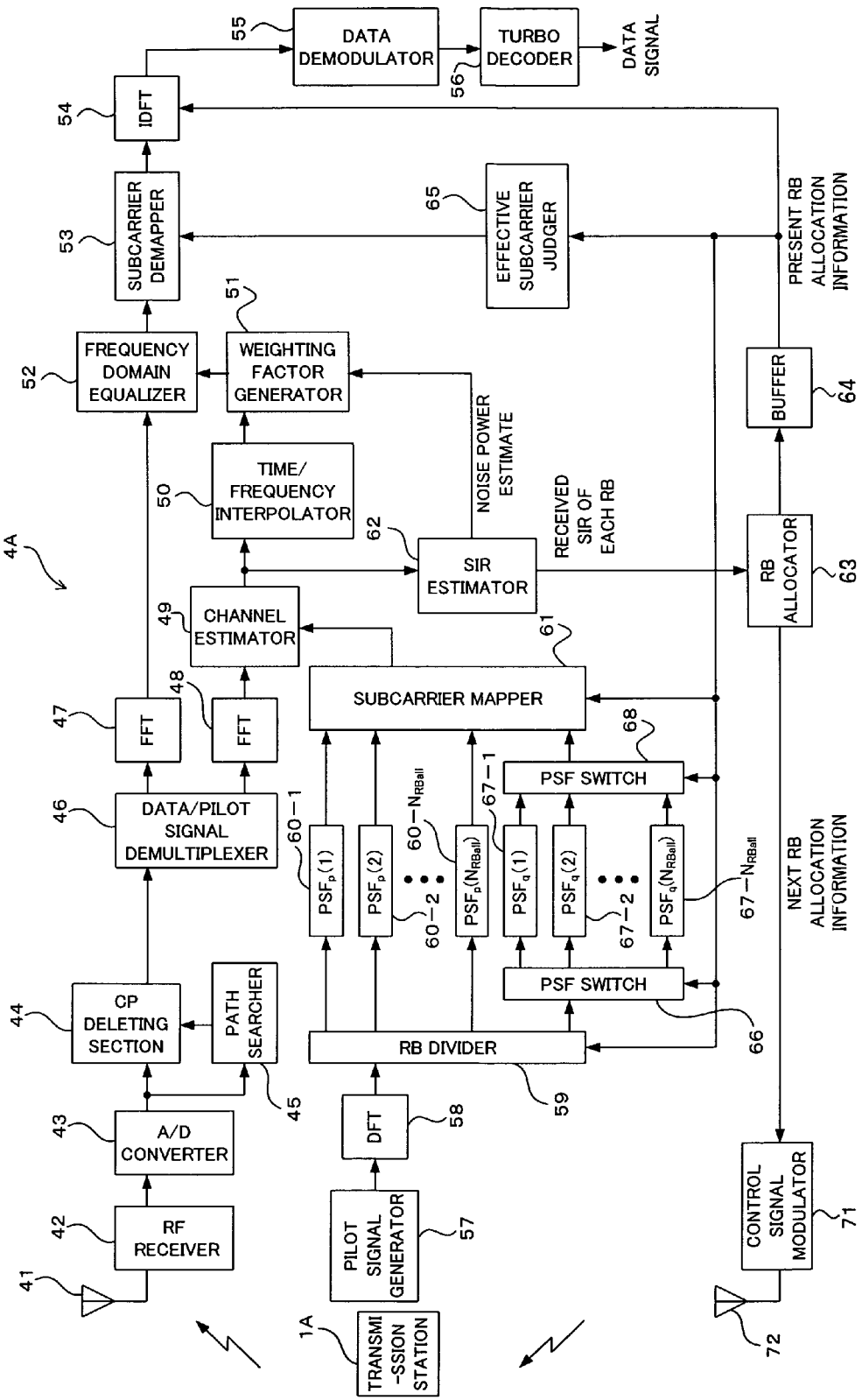
FIG. 8 is a functional block diagram showing a modification of the transmission station shown in FIG. 4.

Meanwhile, in the reception station (radio reception apparatus) 4A shown in FIG. 8, the PSF switch 66 undergoes the switching of input/output on the basis of the present RB allocation information from the buffer 64 so that, of divided pilot replicas obtained by dividing a pilot replica by the total number ($N_{RBall}$) of RBs in the RB divider 59, a pilot replica of an arbitrary (any one) RB can be inputted to an arbitrary (anyone) waveform shaping filter 67-$i$. In this modification, a pilot replica corresponding to an RB to which an effective data signal is not allocated is inputted to one waveform shaping filter 67-$i$ on the basis of the aforesaid RB allocation information and, hence, the pilot replicas corresponding to two or more RBs adjacent to each other in a frequency domain are collectively waveform-shaped in continuously existing frequency bands.

The waveform shaping filters 67-$i$ are equal to the waveform shaping filters 33-$i$ on the transmission station 1A side and handle different frequency bands of a system frequency band, respectively, and are designed to, for example, in a state where an occupied bandwidth of an RB of a data signal is set as a minimum unit, collectively waveform-shape signals of different frequency bands adjacent to each other with respect to this unit in the frequency domain through the use of window functions with the same roll-off rate $\alpha$.

The PSF switch 68 undergoes the switching of input/output on the basis of the aforesaid RB allocation information in synchronism with the PSF switch 66 so as to output the pilot replicas after the waveform shaping by the respective waveform shaping filters 67-$i$ to the subcarrier mapper 61.

That is, in the reception station 4A according to this modification, after the transmission pilot replica in the frequency domain, DFT-processed by the DFT section 58, is divided by total number ($N_{RBall}$) of RBs in the RB divider 59 as well as the transmission station 1A, the waveform shaping filters 60-$i$ are applied with respect to the pilot replicas corresponding to RBs, to which effective data signals are allocated on the basis of the aforesaid RB allocation information, in units of division, while appropriate waveform shaping filters 67-$i$ are applied with respect to the pilot replicas of two or more RBs adjacent to each other, to which the effective data signals are not allocated, in a manner such that the PSF switches 66 and 68 undergo the switching operations in synchronism with each other, thus enabling the filters 67-$i$ with the same roll-off rate $\alpha$ to be applied collectively in continuously existing frequency bands.

Therefore, under the same arrangement as the distributed arrangement of the pilot signal on the transmission station 1A side, for example, mentioned above with reference to FIG. 7, the pilot replica to be used for the channel estimation in the channel estimator 49 is subcarrier-mapped in the subcarrier mapper 61.

Figure 9:
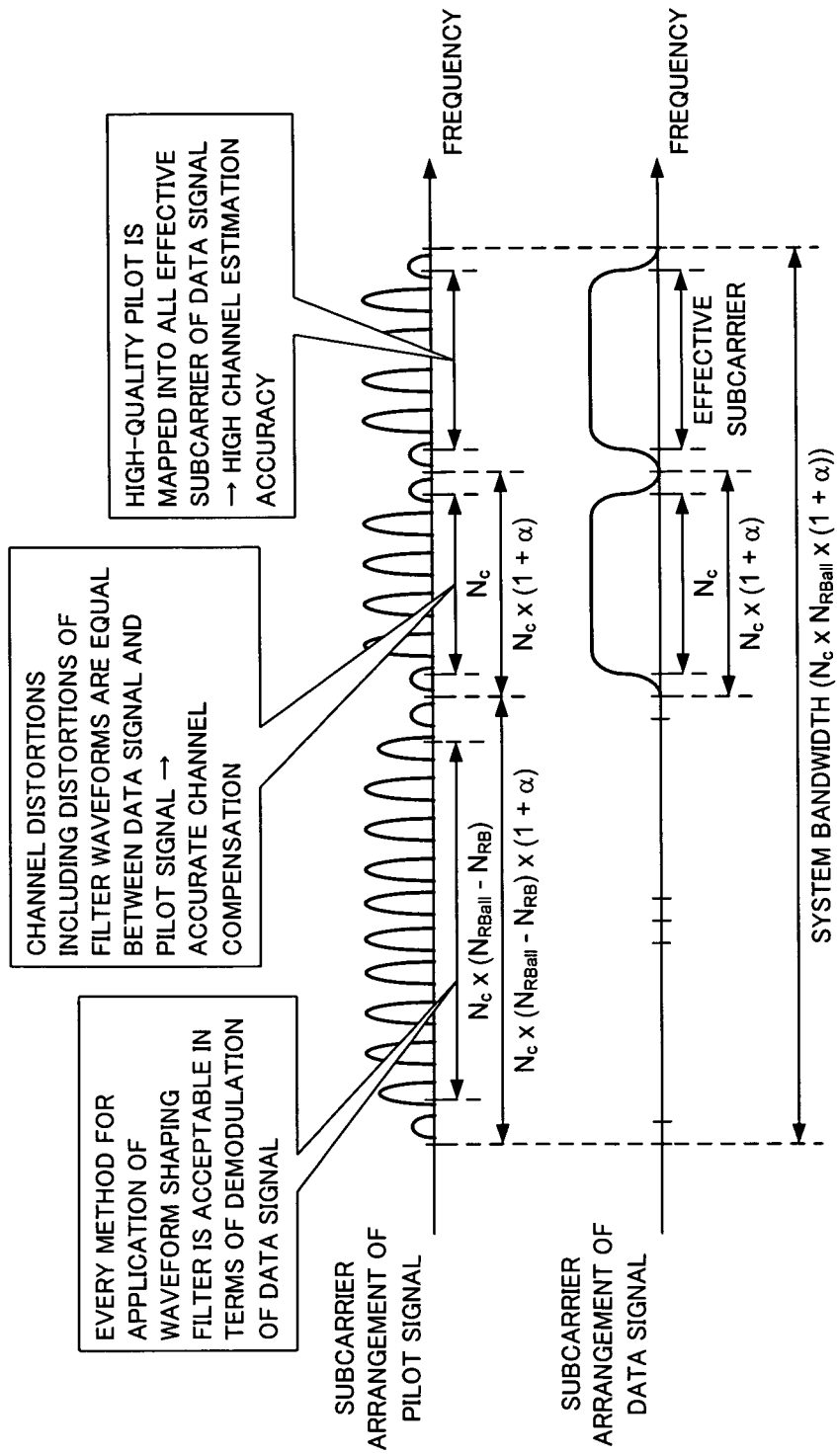
FIG. 9 is an illustration of a comparison between a subcarrier arrangement of a data signal shown in FIG. 2 and a subcarrier arrangement of a pilot signal shown in FIG. 7.

FIG. 9 is an illustration of a comparison between a subcarrier arrangement (see FIG. 2) of a data signal and a subcarrier arrangement of a pilot signal (pilot replica) shown in FIG. 7. As seen from FIG. 9, since a pilot signal is mapped with respect to an effective subcarrier into an effective data signal is mapped as well as the above-described embodiment (see FIG. 5), the demodulation performance (channel estimation accuracy and the accuracy of channel compensation) for a data signal is improvable and the data signal reception characteristic is improvable.

On the other hand, since a pilot signal (pilot replica) mapped into a subcarrier where no effective data signal is mapped is not used for the data signal demodulation, the waveform shaping filter applying method is unquestioned, and the waveform shaping filters having different roll-off rates $\alpha$ can be used in a band unit different from that of the data signal for convenience in other applications such as SIR estimation.

It should be understood that the present invention is not limited to the above-described embodiment and modification, and that it is intended to cover all changes of the embodiments of the invention herein which do not constitute departures from the spirit and scope of the invention.

For example, although in the above description the system band is band-divided by a fixed frequency width, the division bandwidth is freely variable (a fixed band unit is not required) on the premise that waveform shaping filters having the same roll-off rate $\alpha$ are applied with respect to a data signal and a pilot signal in terms of a subcarrier (partial band of a system band) where at least an effective data signal exists.

In addition, although in the above-described embodiment the waveform shaping filters having the same roll-off rate $\alpha$ are applied with respect to the data signal and the pilot signal, since a window function other than the Root raised cosine function can also be used for the reduction of the PAPR of a transmission signal as mentioned above, it is also possible to carry out the waveform shaping (filtering) through the use of a window function, which is not defined by a roll-off rate, so as to provide the same configurations in a frequency domain.

Still additionally, although in the above description the DFT-Spread OFDM is put to use, the present invention is not limited to this, but the invention is likewise applicable to a radio method in which transmission is made in a state where at least different occupied bands are taken between a pilot signal and a data signal and, in this case, it is expectable to provide effects and advantage similar to those of the above-described embodiment and modification.

As described above in detail, according to the present invention, since a pilot signal and a data signal, transmitted through the use of a partial band of a system band, are waveform-shaped so as to have the same configuration in a frequency domain, it is possible to map a high-quality pilot signal or a pilot signal equal in channel distortion to a data signal with respect to all the effective frequencies of the data signal. Accordingly, it is possible to enhance the data signal demodulation processing capability (channel estimation accuracy and channel compensation capability) in the reception side while suppressing the PAPR of a transmission signal, which improves the data signal reception characteristic. Therefore, it is considerable that the present invention is extremely useful for the fields of radio communication technology, particularly, mobile communication technology.

What is claimed is:

1. A radio transmission method of transmitting a data signal and a pilot signal to be used for demodulation processing on said data signal by wireless, comprising:
   transmitting said pilot signal using a predetermined frequency band;
   transmitting said data signal using a partial band of said frequency band; and
   controlling waveforms of said data signal transmitted by using said partial band and said pilot signal transmitted by using a band having a same bandwidth as said partial band, by first filters having an identical first roll-off rate; wherein
   said predetermined frequency band is divided by a predetermined band unit so that said data signal is transmitted in a state where each of the divided bands is set as said partial band, and
   said waveforms of said data signal and said pilot signal are controlled in units of the divided bands by the first filters.

2. The radio transmission method according to claim 1, wherein the waveforms of said pilot signals in a plurality of divided bands continuously existing among said divided bands and being allocated no data signal are collectively controlled in a state where said plurality of divided bands are set as one band by second filters having a second roll-off rate.

3. A radio transmission method of transmitting a data signal and a pilot signal to be used for demodulation processing on said data signal by wireless, comprising:
   transmitting said pilot signal using a predetermined frequency band;
   transmitting said data signal using a partial band of said frequency band, said predetermined frequency band being divided by a predetermined band unit so that said data signal is transmitted in a state where each of the divided bands is set as said partial band; and
   controlling waveforms of said pilot signal and said data signal, transmitted by using at least said partial band, in units of the divided bands by first filters having an identical first roll-off rate; wherein
   the waveforms of said pilot signals in a plurality of divided bands continuously existing among said divided bands and being allocated no data signal are collectively controlled in a state where said plurality of divided bands are set as one band by second filters having a second roll-off rate, and
   the first roll-off rate in said plurality of divided bands to which said data signal is allocated is different from the second roll-off rate.

4. The radio transmission method according to claim 1, wherein the waveform controlling is conducted in a frequency domain by the first filters.

5. A radio reception method of receiving a pilot signal and a data signal by wireless from a radio transmission apparatus transmitting the pilot signal to be used for demodulation processing on the data signal using a predetermined frequency band and transmitting the data signal using a partial band of said frequency band, and the waveforms of the data signal, which is to be transmitted using said partial band, and the pilot signal, which is to be transmitted by using a band having a same bandwidth as said partial band, in said radio transmission apparatus are controlled by first filters having an identical first roll-off rate, comprising:
   generating a replica of said pilot signal;
   controlling a waveform of said replica generated in at least said partial band by the first filters; and
   carrying out demodulation processing on a received data signal in said partial band on the basis of said replica with the controlled waveform and said pilot signal received from said radio transmission apparatus; wherein each of divided bands obtained by dividing said predetermined frequency band by a predetermined band unit is set as said partial band, and the waveform controlling is conducted in units of said divided bands by the first filters.

6. The radio reception method according to claim 5, wherein the waveforms of said replicas in a plurality of divided bands continuously existing among said divided bands and being allocated no data signal are collectively controlled in a state where said plurality of divided bands are set as one band by second filters having a second roll-off rate.

7. A radio reception method of receiving a pilot signal and a data signal by wireless from a radio transmission apparatus transmitting the pilot signal to be used for demodulation processing on the data signal using a predetermined frequency band and transmitting the data signal using a partial band of said frequency band which are to be transmitting by using at least said partial band, and the waveforms of the data signal, which is to be transmitted using said partial band, and the pilot signal, which is to be transmitted by using a band having a same bandwidth as said partial band, in said radio transmission apparatus are controlled by first filters having an identical first roll-off rate, comprising:
   generating a replica of said pilot signal, controlling a waveform of said replica generated in at least said partial band by the first filters; and
   carrying out demodulation processing on a received data signal in said partial band on the basis of said replica with the controlled waveform and said pilot signal received from said radio transmission apparatus; wherein each of divided bands obtained by dividing said predetermined frequency band by a predetermined band unit is set as said partial band, and the waveform controlling is conducted in units of said divided bands by the first filters, the waveforms of said replicas in a plurality of divided bands continuously existing among said divided bands and being allocated no data signal are collectively controlled in a state where said plurality of divided bands are set as one band by second filters having a second roll-off rate, and
   the first roll-off rate in said plurality of divided bands to which said data signal is allocated is different from the second roll-off rate.

8. The radio reception method according to claim 5, wherein the waveform controlling is conducted in a frequency domain by using the first filters.

9. A radio transmission apparatus, which transmits a data signal and a pilot signal to be used for demodulation processing on said data signal by wireless, comprising:

a transmitter which transmits said pilot signal using a predetermined frequency band and said data signal using a partial band of said frequency band; and waveform control section which controls waveforms of said data signal transmitted by using said partial band and said pilot signal transmitted by using a band having a same bandwidth as said partial band, by first filters having an identical first roll-off rate; wherein said transmitter includes:

a data signal band divider for dividing said data signal in a state associated with divided bands obtained by dividing said predetermined frequency band by a predetermined band unit;

a data signal filtering section for controlling a waveform of said data signal in units of data signals obtained by the division by said data signal band divider by part of the first filters;

a data signal mapper for mapping said data signal, the waveform of which is controlled by said data signal filtering section into said divided band forming said partial band;

a pilot signal band divider for dividing said pilot signal by a unit of the divided band;

a pilot signal filtering section for controlling a waveform of said pilot signal in units of pilot signals obtained by the division by said pilot signal band divider by the remaining part of the first filters; and a pilot signal mapper for mapping said pilot signal controlled its waveform by said pilot signal filtering section into said divided bands.

10. The radio transmission apparatus according to claim 9, wherein said pilot signal filtering section controls collectively waveforms of said pilot signals in a plurality of divided bands continuously existing among said divided bands and being allocated no data signal in a state where said plurality of divided bands are set as one band by second roll-off filters having a second roll-off rate.

11. A radio transmission apparatus, which transmits a data signal and a pilot signal to be used for demodulation processing on said data signal by wireless, comprising:

a transmitter which transmits said pilot signal using a predetermined frequency band and said data signal using a partial band of said frequency band; and waveform control section which controls waveforms of said pilot signal and said data signal, transmitted by using at least said partial band, by first filters having an identical first roll-off rate; wherein said transmitter includes:

a data signal band divider for dividing said data signal in a state associated with divided bands obtained by dividing said predetermined frequency band by a predetermined band unit;

a data signal filtering section for controlling a waveform of said data signal in units of data signals obtained by the division by said data signal band divider by part of the first filters;

a data signal mapper for mapping said data signal, the waveform of which is controlled by said data signal filtering section into said divided band forming said partial band;

a pilot signal band divider for dividing said pilot signal by a unit of the divided band;

a pilot signal filtering section for controlling a waveform of said pilot signal in units of pilot signals obtained by the division by said pilot signal band divider by the remaining part of the first filters; and a pilot signal mapper for mapping said pilot signal controlled its waveform by said pilot signal filtering section into said divided bands; wherein said pilot signal filtering section controls collectively waveforms of said pilot signals in a plurality of divided bands continuously existing among said divided bands and being allocated no data signal in a state where said plurality of divided bands are set as one band by second roll-off filters having a second roll-off rate, and the first roll-off rate in said plurality of divided bands to which said data signal is allocated is different the second roll-off rate.

12. The radio transmission apparatus according to claim 9, wherein the first filters conduct waveform controlling in a frequency domain.

13. The radio transmission apparatus according to claim 10, wherein the first filters conduct waveform controlling in a frequency domain.

14. The radio transmission apparatus according to claim 11, wherein the first filters conduct waveform controlling in a frequency domain.

15. A radio reception apparatus, which receives a pilot signal and a data signal by wireless from a radio transmission apparatus transmitting the pilot signal to be used for demodulation processing on a data signal using a predetermined frequency band and transmitting the data signal using a partial band of said frequency band, the waveforms of said data signal, which is to be transmitted by using said partial band, and said pilot signal, which is to be transmitted by using a band having a same bandwidth as said partial band, in said radio transmission apparatus are controlled by first filters having an identical first roll-off rate, comprising:

a pilot replica generator which generates a replica of said pilot signal;

waveform control section which controls a waveform of said replica generated by said pilot replica generator with respect to at least said partial band by the first filters; and a demodulator which carries out demodulation processing on a data signal in said partial band on the basis of said replica with the controlled waveform by said waveform shaping filters and said pilot signal received from said radio transmission apparatus;

wherein each of divided bands obtained by dividing said predetermined frequency band by a predetermined band unit is set as said partial band, and the waveform control section is conducted in units of said divided bands by the first filters.

* * * * *